US011904518B2

(12) United States Patent
Fujiwara et al.

(10) Patent No.: US 11,904,518 B2
(45) Date of Patent: *Feb. 20, 2024

(54) THERMOPLASTIC RESIN SHEET HAVING HAIRLIKE BODIES AND MOLDED PRODUCT THEREOF

(71) Applicant: Denka Company Limited, Tokyo (JP)

(72) Inventors: Junpei Fujiwara, Gunma (JP); Yasushi Hirokawa, Gunma (JP); Tomohiro Osawa, Gunma (JP)

(73) Assignee: Denka Company Limited, Tokyo (JP)

(*) Notice: Subject to any disclaimer, the term of this patent is extended or adjusted under 35 U.S.C. 154(b) by 676 days.

This patent is subject to a terminal disclaimer.

(21) Appl. No.: 16/318,874

(22) PCT Filed: Jul. 20, 2017

(86) PCT No.: PCT/JP2017/026211
§ 371 (c)(1),
(2) Date: Jan. 18, 2019

(87) PCT Pub. No.: WO2018/016562
PCT Pub. Date: Jan. 25, 2018

(65) Prior Publication Data
US 2019/0283301 A1    Sep. 19, 2019

(30) Foreign Application Priority Data

Jul. 20, 2016 (JP) ................. 2016-142822

(51) Int. Cl.
*B32B 3/30* (2006.01)
*B32B 27/08* (2006.01)
*B32B 27/00* (2006.01)
*B29C 48/00* (2019.01)
(Continued)

(52) U.S. Cl.
CPC ............ *B29C 48/002* (2019.02); *B29C 48/07* (2019.02); *B29C 51/10* (2013.01); *B29C 59/04* (2013.01);
(Continued)

(58) Field of Classification Search
CPC ... B29C 51/004; B29C 51/145; B29C 59/025; B32B 3/30; B32B 27/00; B32B 27/08;
(Continued)

(56) References Cited

U.S. PATENT DOCUMENTS 3,390,403 A    6/1968 Tilburg
3,557,407 A    1/1971 Lemelson
(Continued)

FOREIGN PATENT DOCUMENTS

CA    2324313 A1    9/1999
CN    104853916 A    8/2015
(Continued)

OTHER PUBLICATIONS

Espacenet translation of WO 2015159825, accessed on Jul. 28, 2021. (Year: 2015).*

*Primary Examiner* — Jeremy R Pierce
*Assistant Examiner* — Christine X Nisula
(74) *Attorney, Agent, or Firm* — Foley & Lardner LLP

(57) ABSTRACT

[Problem] The objective of the present invention is to provide a sheet expressing a good tactile sensation and a molded product thereof.
[Solution] A sheet expressing a good tactile sensation and a molded product thereof are provided by configuring a thermoplastic resin sheet having a base layer and hairlike bodies arranged regularly on at least one surface thereof, wherein a continuous phase is formed without a structural boundary between the base layer and the hairlike bodies.

13 Claims, 6 Drawing Sheets

(51) Int. Cl.
    *B29C 48/07*     (2019.01)
    *B29C 59/04*     (2006.01)
    *B32B 7/12*     (2006.01)
    *B32B 3/26*     (2006.01)
    *B29C 51/10*     (2006.01)
    *B29L 31/30*     (2006.01)
    *B29L 31/34*     (2006.01)
    *B29L 31/00*     (2006.01)

(52) U.S. Cl.
    CPC .................. *B32B 3/26* (2013.01); *B32B 3/30* (2013.01); *B32B 7/12* (2013.01); *B32B 27/00* (2013.01); *B32B 27/08* (2013.01); *B29L 2031/3005* (2013.01); *B29L 2031/3481* (2013.01); *B29L 2031/712* (2013.01); *B32B 2250/24* (2013.01); *B32B 2307/21* (2013.01); *B32B 2307/732* (2013.01)

(58) Field of Classification Search
    CPC ....... B32B 5/12; B32B 7/03; Y10T 428/2395; Y10T 428/23943; Y10T 428/23957
    USPC .............................................. 428/90, 91, 92
    See application file for complete search history.

(56) References Cited

U.S. PATENT DOCUMENTS

| | | |
|---|---|---|
| 6,511,734 B1 | 1/2003 | Wagner |
| 6,610,382 B1 * | 8/2003 | Kobe ...................... B32B 27/08 428/119 |
| 2004/0005434 A1 * | 1/2004 | Calhoun ................ D04H 11/08 428/91 |
| 2004/0121120 A1 * | 6/2004 | Gray .................... B23K 26/384 428/119 |
| 2009/0033000 A1 | 2/2009 | Kurtz, Jr. |
| 2015/0306852 A1 | 10/2015 | Fujiwara et al. |
| 2015/0314554 A1 * | 11/2015 | Fujiwara ............... B32B 27/302 428/35.7 |
| 2015/0322246 A1 * | 11/2015 | Broyles ...................... C08J 5/18 428/141 |

FOREIGN PATENT DOCUMENTS

| | | |
|---|---|---|
| JP | 07-001626 A | 1/1995 |
| JP | 08-142103 A | 6/1996 |
| JP | 09-057934 A | 3/1997 |
| JP | 09-155972 A | 6/1997 |
| JP | 2002-506753 A | 3/2002 |
| JP | 2002-526669 A | 8/2002 |
| JP | 2007-290158 A | 11/2007 |
| JP | 2010-280203 A | 12/2010 |
| JP | 2011-098739 A | 5/2011 |
| JP | 2011-152795 A | 8/2011 |
| JP | 4877008 B2 | 2/2012 |
| JP | 2012-101503 A | 5/2012 |
| JP | 2012-223922 A | 11/2012 |
| WO | WO-2014087695 A1 * | 6/2014 ............... B32B 1/02 |
| WO | WO 2015/159825 A1 | 10/2015 |

* cited by examiner

THERMOPLASTIC RESIN SHEET HAVING HAIRLIKE BODIES AND MOLDED PRODUCT THEREOF

CROSS-REFERENCE TO RELATED APPLICATIONS

This application is the U.S. National Stage of PCT/JP2017/026211, filed Jul. 20, 2017, which claims priority to JP 2016-142822, filed Jul. 20, 2016.

TECHNICAL FIELD

The present invention pertains to a thermoplastic resin sheet having hairlike bodies and a molded product thereof.

BACKGROUND ART

Conventionally, sheets of paper and polymer materials are used as interior materials of automobiles and the housings of associated components, housings of electronic devices and appliances, building materials such as wallpaper, housings for toys and game consoles, and members of daily necessities. Further, as a method to provide a good tactile sensation to a surface of a sheet, Patent Document 1, for example, presents a decorative sheet wherein a thermoplastic polyester based resin is extrusion laminated on a decorative paper.

Patent Document 2 presents a decorative sheet containing resin beads. Patent Document 3 presents a decorative resin sheet in which a polylactic acid resin is coated with a urethane based resin and a surface thereof is heat-embossed.

Furthermore, Patent Document 4 presents a decorative sheet in which, in order for a relief shape on the sheet surface not to be impaired, a protective layer consisting of anti-abrasive particles and a urethane based resin is formed on a surface of an embossed ABS resin sheet. Patent Document 5 presents a container having a plurality of stripes in a fixed direction and provided with a napped decorative surface formed by raising a nap from the stripes.

However, the provision of a resin sheet expressing a better tactile sensation is desired.
[Patent Document 1] JP H9-057934 A
[Patent Document 2] JP 04877008 B
[Patent Document 3] JP 2011-152795 A
[Patent Document 4] JP 2010-280203 A
[Patent Document 5] JP 2011-098739 A

SUMMARY OF INVENTION

Technical Problem

The object of the present invention is to provide a sheet expressing a good tactile sensation and a molded product thereof.

Solution to Problem

That is, as a result of investigation of various tactile sensation-expressing means, the present inventors believed that it would be good to provide a hairlike shape to a sheet surface to express a good tactile sensation and discovered that a good tactile sensation is expressed by forming hairlike bodies arranged regularly on a surface, arriving at completion of the present invention.

The present invention, which solves the above problem, is configured as follows.

(1) A thermoplastic resin sheet having hairlike bodies arranged regularly on at least one surface of a base layer, wherein a continuous phase is formed without a structural boundary between the base layer and the hairlike bodies.

(2) The resin sheet described in (1), wherein the thermoplastic resin is a thermoplastic resin using one or more of a styrene based resin, an olefin based resin, a polyvinyl chloride resin, a thermoplastic elastomer, a fluorine based resin, a polyester based resin, and a nylon based resin.

(3) The resin sheet described in (1) or (2), wherein the average height of the hairlike bodies is no less than 100 μm and no greater than 1,200 μm, the average diameter of the hairlike bodies is no less than 1 μm and no greater than 50 μm, and the average spacing between the hairlike bodies is no less than 20 μm and no greater than 200 μm.

(4) The resin sheet described in any one of (1) to (3), wherein the ratio of the static friction coefficient of the surface having the hairlike bodies with respect to the dynamic friction coefficient thereof is 1.0-10.0.

(5) The resin sheet described in any one of (1) to (4), wherein the heat transfer speed of the surface having the hairlike bodies, when in contact, is 0.005-0.500.

(6) The resin sheet described in any one of (1) to (5), wherein the average thickness of the base layer is no less than 50 μm.

(7) The resin sheet described in any one of (1) to (6), configured so the hairlike bodies extend hairlike in a direction away from the base layer and a swelling is formed at the tips thereof.

(8) The resin sheet described in any one of (1) to (7), wherein the base layer and the hairlike bodies are formed from a single sheet.

(9) The resin sheet described in any one of (1) to (8), wherein the resin sheet is a multilayer resin sheet.

(10) The resin sheet described in any one of (1) to (9), wherein at least one substrate layer selected from a styrene based resin, an olefin based resin, a polyester based resin, a nylon based resin, an acrylic based resin, and a thermoplastic elastomer is laminated on the other surface of the base layer.

(11) The resin sheet described in any one of (1) to (10), comprising one or more additives selected from a water and oil repellent, an antistatic agent, and an antibacterial agent.

(12) A manufacturing method for the resin sheet described in any one of (1) to (11), characterized in that the hairlike bodies are formed by casting, with a transfer roll on which a relief process has been performed and a touch roll, a sheet that has been melt-extruded from a die with a melt extrusion technique.

(13) A molded product of the resin sheet described in any one of (1) to (11).

(14) The molded product described in (13), which is a stationery member.

(15) The molded product described in (13), which is an automobile interior member, an electronic device, an electronic device cladding, a cosmetic container, or a container member that is vacuum/pressure molded on a surface of an existing molded product.

Advantageous Effects of Invention

According to the present invention, a sheet expressing a good tactile sensation can be provided.

DESCRIPTION OF EMBODIMENTS

Below, various embodiments of the resin sheet shall be explained, followed by an explanation of the method for manufacturing the resin sheet, but in cases in which the specific explanation of one embodiment disclosed herein applies to another embodiment, the explanation thereof for the other embodiment shall be omitted.

First Embodiment

The resin sheet according to the first embodiment of the present invention is a thermoplastic resin sheet having hairlike bodies arranged regularly on at least one surface of a base layer, wherein a continuous phase is formed without a structural boundary between the base layer and the hairlike bodies.

<Base Layer>

Figure 1:
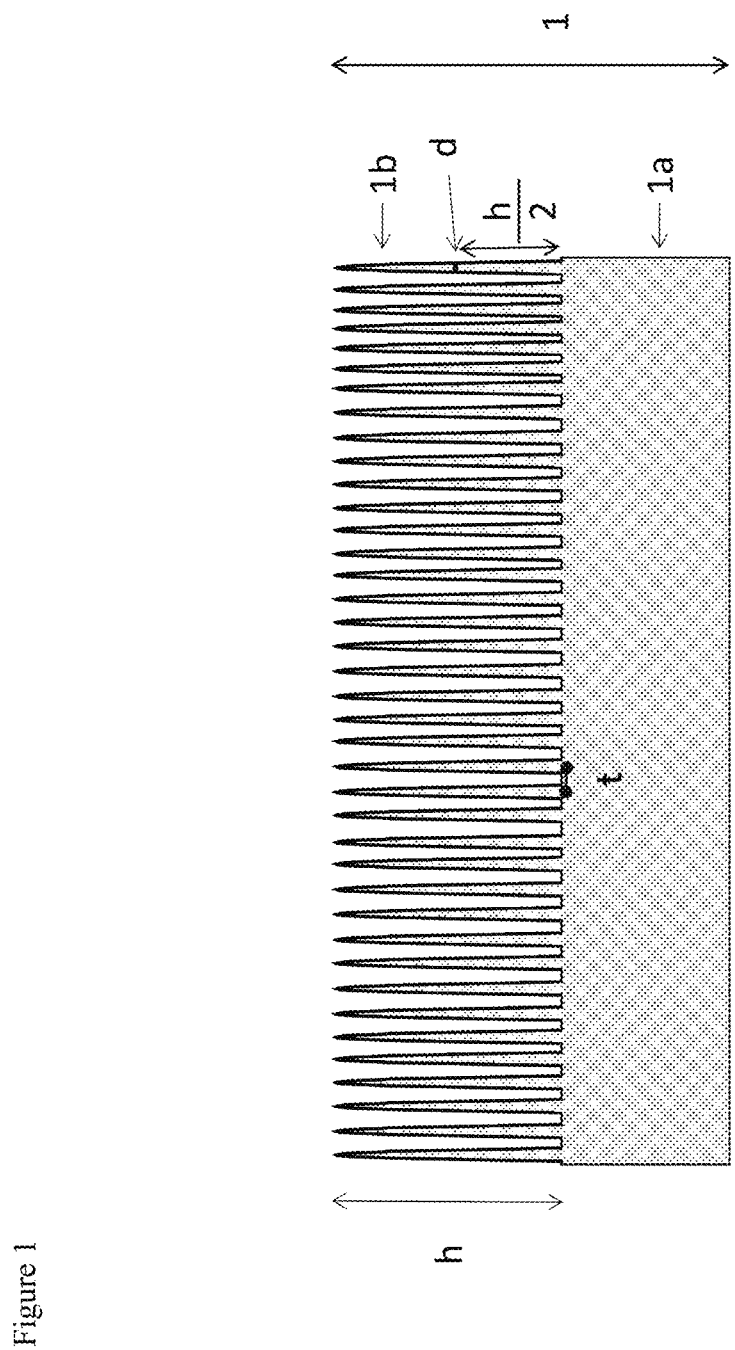
FIG. 1 is a simplified vertical side cross-sectional view showing a resin sheet according to the first embodiment of the present invention.

The base layer (1a) is the portion of the surface other than the hairlike bodies, as shown in FIG. 1. The thickness of the base layer is the thickness from the roots of the hairlike bodies to the surface on the opposite side of the base layer. It is preferable that the average thickness of the base layer is 50-1,000 µm and more preferably, 150-800 µm. By setting the thickness to no less than 50 µm, the height of the hairlike bodies can be sufficiently expressed. Further, by setting the thickness to no greater than 1,000 µm, the hairlike bodies can be formed efficiently. A continuous phase is formed without a structural boundary between the base layer and the hairlike bodies. The absence of a structural boundary means that the base layer and hairlike bodies are integrally formed and that there is no structurally clear border section therebetween. Further, forming a continuous phase is a state in which there are no seams between the base layer and the hairlike bodies and no discontinuities (is a continuous phase). On this point, the present invention differs from a structure in which hairlike bodies are transplanted to a base layer. The base layer and hairlike bodies have the same composition and the bonds between the base layer and the hairlike bodies may include covalent bonds. Covalent bonds are chemical bonds formed by an electron pair being shared by two atoms, but in thermoplastic resins which are chain molecules in which the monomers are connected, each polymer is bonded by covalent bonds and is bonded more strongly than by the van der Waals bonds or hydrogen bonds acting between the polymer molecules.

Further, the base layer and the hairlike bodies may be derived not from separate, but from the same solid thermoplastic resin sheet. Derived from the same solid thermoplastic resin sheet means, for example, the hairlike bodies and the base layer being obtained, directly or indirectly, based on the same solid resin sheet.

Further, the base layer and the hairlike bodies may be formed from the same solid thermoplastic resin sheet. Formed from the same solid thermoplastic resin sheet means that the hairlike bodies and the base layer are directly formed by working a single resin sheet.

By forming a continuous phase without a structural boundary between the base layer and the hairlike bodies, the hairlike bodies separating from the base layer due to an external stimulus is suppressed and the sheet becomes one with a good tactile sensation. Further, manufacturing with fewer steps than when transplanting hairlike bodies can be carried out.

The base layer comprises a thermoplastic resin, and a resin comprising at least one of a styrene based resin, an olefin based resin, a polyvinyl chloride resin, a thermoplastic elastomer, a fluorine based resin, a polyester based resin, and a nylon based resin can be used as the thermoplastic resin.

Styrene based monomers such as styrene, α-methylstyrene, p-methylstyrene, dimethylstyrene, p-t-butylstyrene, or chlorostyrene alone or copolymers thereof, copolymers of such a styrene based monomer and another monomer, for example, a styrene-acrylonitrile copolymer (AS resin), or of the styrene based monomer and yet another polymer, for example, a grafted polymer graft polymerized in the presence of a diene based rubber-like polymer such as polybutadiene, a styrene-butadiene copolymer, polyisoprene, or polychloroprene, for example, a polystyrene such as high-impact polystyrene (HIPS resin) or a styrene-acrylonitrile graft polymer (ABS resin) can be used as the styrene based resin. Further, a styrene based thermoplastic elastomer can also be used.

Polyolefin based resin means a resin comprising a polymer comprising α-olefin as a monomer and includes polyethylene based resins and polypropylene based resins. A high-density polyethylene, a low-density polyethylene, a straight chain low-density polyethylene, a straight chain medium-density polyethylene, etc. can be used as the polyethylene resin and not only these alone, but a copolymer, graft, or blend having these structures can also be used. As the latter resin, there are, for example, products of copolymerizing or blending a resin having a polar group in a polyethylene chain, such as products of copolymerizing or blending an ethylene-vinyl acetate copolymer, an ethylene-acrylic acid copolymer, an ethylene-acrylic ester copolymer, an ethylene methacrylic ester copolymer, an ethylene-vinyl acetate-vinyl chloride copolymer, or three-component copolymers with a further acid anhydride.

Further, a homopolypropylene, a random polypropylene, a block polypropylene, etc. can be used as the polypropylene resin. When using a homopolypropylene, the structure of the homopolypropylene may be any of isotactic, atactic, or syndiotactic. When using a random polypropylene, a substance preferably having 2-20 carbon atoms and more preferably having 4-12 carbon atoms, for example, ethylene, 1-butene, 1-pentene, 1-hexene, 1-heptene, 1-octene, 1-nonene, or 1-decene can be used as the α-olefin to be copolymerized with propylene. When using a block polypropylene, a block copolymer (block polypropylene), a block copolymer comprising a rubber component, a graft copolymer, etc. can be used. In addition to using these olefin based resins alone, they may be used in combination with other olefin based resins.

A vinyl chloride homopolymer or a copolymer of vinyl chloride and another comonomer can be used as the polyvinyl chloride resin. When the polyvinyl chloride is a copolymer, the polyvinyl chloride may be a random copolymer or may be a graft copolymer. A substance in which, for example, an ethylene-vinyl acetate copolymer or a thermoplastic urethane polymer is made the trunk polymer and vinyl chloride is graft polymerized thereto can be raised as one example of a graft copolymer. The polyvinyl chloride of the present embodiment is a composition demonstrating an extrusion-moldable soft polyvinyl chloride and containing an additive such as a polymer plasticizer. A known polymer plasticizer can be used as the polymer plasticizer, but, for example, an ethylene copolymer polymer plasticizer such as an ethylene-vinyl acetate-carbon monoxide copolymer, an ethylene-(meth)acrylic ester-carbon monoxide copolymer, or an ethylene-vinyl acetate copolymer with a high vinyl acetate content can be raised as a preferred example.

Substances having a structure in which a soft polymer substance and a hard polymer substance are combined are included as the thermoplastic elastomer. Specifically, there are styrene based elastomers, olefin based elastomers, vinyl chloride based elastomers, polyester based elastomers, polyamide based elastomers, polyurethane based elastomers, etc. Regarding polyurethane based elastomers, either polyether based or polyester based elastomers may be selected. These elastomers can be selected and used from among those generally commercially available.

A vinylidene fluoride homopolymer and a vinylidene fluoride copolymer having vinylidene fluoride as the main component can be used as the fluorine based resin. Polyvinylidene fluoride (PVDF) resins are crystalline resins exhibiting various crystal structures such as α-type, β-type, γ-type, and αp-type, but as the vinylidene fluoride copolymer, there are, for example, vinylidene fluoride-hexafluoropropylene copolymers, vinylidene fluoride-tetrafluoroethylene copolymers, vinylidene fluoride-chlorotrifluoroethylene copolymers, vinylidene fluoride-trifluoroethylene copolymers, vinylidene fluoride-tetrafluoroethlyene-hexafluoropropylene three-component copolymers, vinylidene fluoride-chlorotrifluoroethylene-hexafluoropropylene three-component copolymers, and mixtures of two or more thereof.

Polyethylene terephthalate, polybutylene terephthalate, polyethylene-2,6-naphthalate, polymethylene terephthalate, and a polyester based resin in which, as copolymerization components, for example, a diol component such as diethylene glycol, neopentyl glycol, and polyalkylene glycol and a dicarboxylic acid component such as adipic acid, sebacic acid, phthalic acid, isophthalic acid, and 2,6-naphthalene dicarboxylic acid are copolymerized can be used as the polyester based resin.

A lactam polymer such as caprolactam and laurolactam, an aminocarboxylic acid polymer such as 6-aminocaproic acid, 11-aminoundecanoic acid, and 12-aminododecanoic acid, a polycondensate of a diamine unit such as an aliphatic diamine such as hexamethylenediamine, decamethylenediamine, dodecamethylenediamine, and 2,2,4- or 2,4-4-trimethylhexamethylenediamine, an alicyclic diamine such as 1,3- or 1,4-bis(aminomethyl)cyclohexane or bis(p-aminocyclohexylmethane), or an aromatic diamine such as m- or p-xylylenediamine, and a dicarboxylic acid unit such as an aliphatic dicarboxylic acid such as adipic acid, suberic acid, and sebacic acid, an alicyclic dicarboxylic acid such as cyclohexanedicarboxylic acid, or an aromatic dicarboxylic acid such as terephthalic acid and isophthalic acid, and copolymers, etc. thereof can be used as the nylon based resin. For example, there are nylon 6, nylon 9, nylon 11, nylon 12, nylon 66, nylon 610, nylon 611, nylon 612, nylon 6T, nylon 6I, nylon MXD6, nylon 6/66, nylon 6/610, nylon 6/6T, nylon 6I/6T, etc. and among these, nylon 6 and nylon MXD6 are suitable.

It is preferable that the melt mass flow rate of the thermoplastic resin is no less than 4 g/10 minutes at 190° C. to 300° C. By setting the rate to no less than 4 g/10 min, the transferability of the shape of the hairlike bodies can be improved. The melt mass flow rate conforms to JIS K 7210 and is a value measured under the conditions of a load of (2.16 to 10.0 kg) at a test temperature in the temperature range from 190° C. to 300° C.

The thermoplastic resin may be alloyed with the above-mentioned thermoplastic resin at any ratio in a range that does not inhibit the effects of the present invention. Furthermore, the thermoplastic resin may contain other additives. Additives such as water/oil repellents, colorants such as pigments or dyes, mold release agents such as silicon oil or alkyl ester based agents, fibrous reinforcement agents such as glass fibers, granular lubricants such as talc, clay, or silica, a salt compound of sulfonic acid and an alkali metal or the like, antistatic agents, ultraviolet absorbing agents, flame retardants, and antibacterial agents can be added as the other additives in a range that does not inhibit the effects of the present invention. Further, scrap resin generated in the resin sheet manufacturing process can be mixed and used.

As the water/oil repellent, there are silicon based water repellents, carnauba wax, and fluorine based water/oil repellents. Organopolysiloxane, dimethylpolysiloxane, methylphenylpolysiloxane, methylhydrogenpolysiloxane, etc. are examples of the silicon and among these, dimethylpolysiloxane is suitably used. As commercial products, there are "Clinbell CB50-PP", "Clinbell CB-30PE", "Clinbell CB-1", "Clinbell CB-50AB" (manufactured by Fuji Chemical Industries, Ltd.), etc. in which, for example, silicon is alloyed with a resin. For the carnauba wax, there is, for example, "Carnauba No. 1" (manufactured by NIKKO RICA CORPORATION), etc. as commercially available products, surfactants having a perfluoroalkyl group as fluorine based oil/water repellents, and "Surflon KT-PA" (manufactured by AGC SEIMI CHEMICAL CO., LTD.) as a commercial product. The amount of the water/oil repellent added is preferably 1 mass % to 25 mass %.

As the antistatic agent, there are polyetheresteramide based polymer-type antistatic agents, ionomer polymer-type antistatic agents, etc. As commercially available polyetheresteramide based polymer-type antistatic agents, there are "Pelestat 230", "Pelestat 6500", "Pelectron AS", "Pelectron HS" (manufactured by Sanyo Chemical Industries, Ltd.), etc. As commercially available ionomer based polymer-type antistatic agents, there are "Entira SD100", "Entira MK400" (manufactured by DU PONT-MITSUI POLYCHEMICALS), etc. The amount of the antistatic agent added is preferably 5 mass % to 30 mass %.

Among inorganic based and organic based antibacterial agents, either may be added. Considering dispersability, inorganic based agents are preferable. Specifically, there are metal ion (Ag, Zn, Cu) inorganic based antibacterial agents, calcined shell calcium based antibacterial agents, etc. As commercially available metal ion inorganic based antibacterial agents, there are "Bactekiller BM102VT" (manufactured by Fuji Chemical Industries, Ltd.), "Novaron VZF200", "Novaron (AG300)" (manufactured by TOAGOSEI CO., LTD.), "KM-10D-G", "IM-10D-L" (manufactured by Sinanen Zeomic Co., Ltd.), etc. As calcined shell calcium based antibacterial agents, there is "Scallow" (manufactured by FID, Ltd.), etc. The amount of the antibacterial agent added is preferably 0.5 mass % to 5 mass %.

<Hairlike Bodies>

The hairlike bodies (1b) comprise a thermoplastic resin and are a portion extending hairlike from the surface of the base layer (1a), as shown in FIG. 1. The hairlike bodies are arranged regularly on the surface of the base layer. Here, the regular arrangement means a state in which the hairlike bodies are not arranged randomly, that is, a state arranged in an orderly fashion in one direction or in two directions. Whether or not the arrangement of the hairlike bodies is regular is determined based on the state of arrangement of the roots of the hairlike bodies. In an embodiment, the hairlike bodies are positioned on the base layer at a predetermined spacing and the positions of the bottom surfaces of the hairlike bodies are arranged in an orderly fashion in the longitudinal direction and the transverse direction of the base layer. Further, the form of arrangement of the hairlike bodies is not particularly limited and a grid arrangement arranged vertically and horizontally, a staggered arrangement, etc. can be selected. Due to the hairlike bodies being arranged regularly on the surface of the base layer, a good tactile sensation is readily expressed, uniformly and without irregularities. Falling of the hairlike bodies occurs due to the application of a load such as, for example, tracing with a finger and finger marks in which the gloss and color tone differ from those of the surrounding portion can be formed. Further, due to the hairlike bodies, the tactile sensation can become like that of a suede-like napped sheet.

The average height (h) of the hairlike bodies is preferably 100-1,200 μm and more preferably 200-900 μm. By setting the average height to no less than 100 μm, a good tactile sensation can be sufficiently ensured and by setting the average height to no greater than 1,200 μm, a good tactile sensation such as moistness, softness, and fluffiness is obtained.

Figure 2:
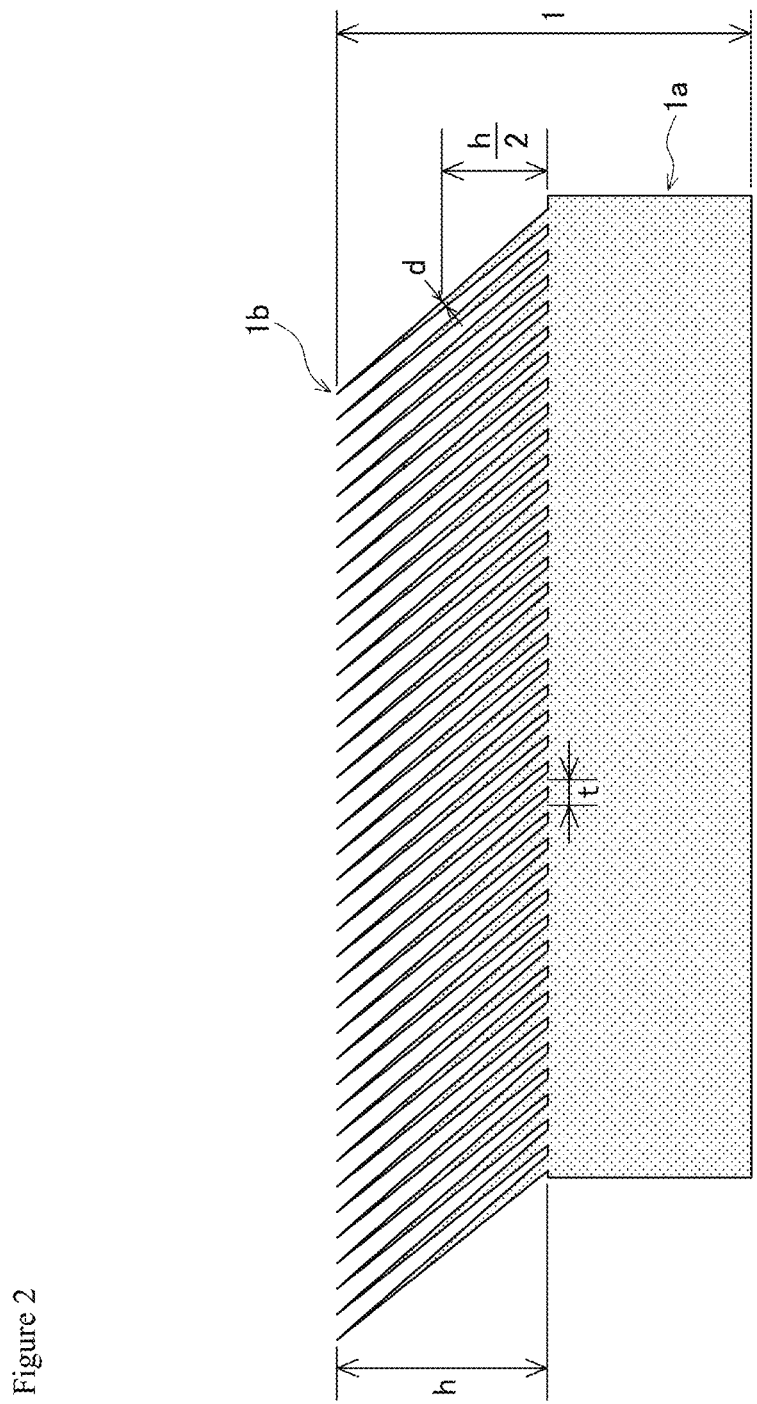
FIG. 2 is a simplified vertical side cross-sectional view showing a variation of the resin sheet according to the first embodiment of the present invention.
Figure 3:
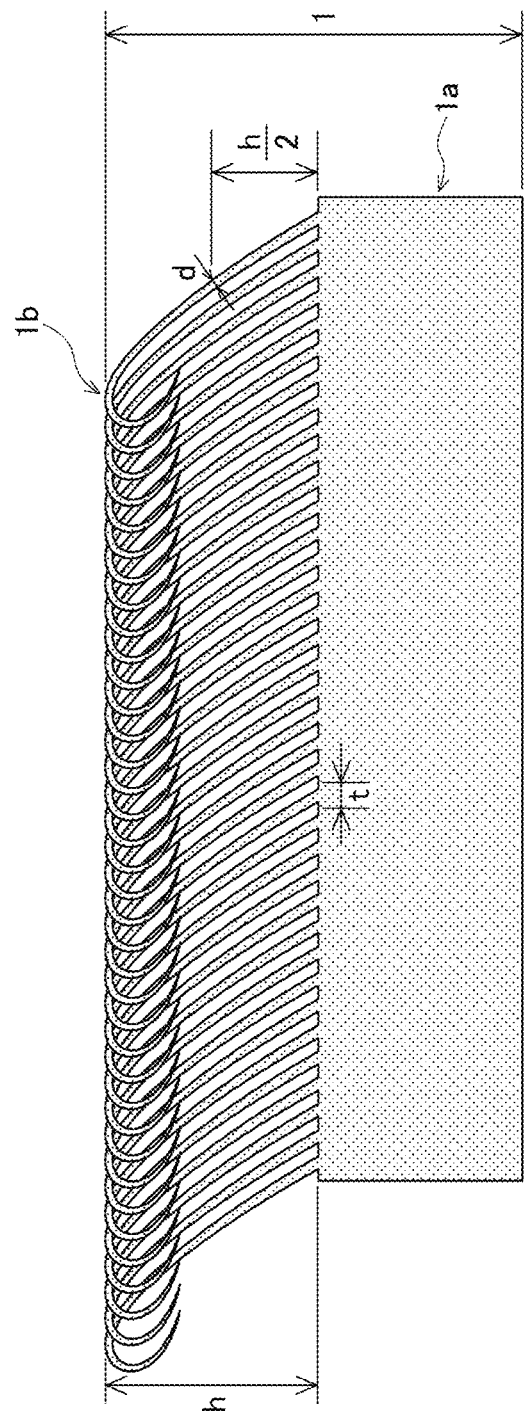
FIG. 3 is a simplified vertical side cross-sectional view showing a further variation of the resin sheet according to the first embodiment of the present invention.

When the hairlike bodies stand roughly straight with respect to the base layer, the length of the hairlike bodies represents the height of the hairlike bodies. Meanwhile, when the hairlike bodies are slanted with respect to the base layer as shown in FIG. 2 or the hairlike bodies have a portion that curls as shown in FIG. 3, the distance from the surface of the base layer at the location of the hairlike bodies most removed from the surface of the base layer is made the height of the hairlike bodies.

The height of the hairlike bodies is measured at a number of random locations on the resin sheet and a calculated average value of the measurements can be used as the average height of the hairlike bodies.

The average diameter (d) of the hairlike bodies is preferably 1-50 μm and more preferably 5-30 μm. By setting the average diameter of the hairlike bodies to no less than 1 μm, a good tactile sensation can be ensured and by setting the average diameter of the hairlike bodies to no greater than 50 μm, a good tactile sensation such as moistness, softness, and fluffiness is obtained. The diameter at mid-height (h/2) of the hairlike bodies is measured at a number of locations on the resin sheet and a calculated average value of the measurements is used as the average diameter of the hairlike bodies.

Further, the aspect ratio of the hairlike bodies when the hairlike bodies are standing roughly straight with respect to the base layer can be represented as (average height of the hairlike bodies/average diameter of the hairlike bodies). When the hairlike bodies are slanted with respect to the base layer or the hairlike bodies have a portion that curls, the aspect ratio can be represented as (average length of the hairlike bodies/average diameter of the hairlike bodies). The length of the hairlike bodies is measured at a number of locations on the resin sheet and a calculated average value of the measurements can be used as the average length of the hairlike bodies. In any case, the aspect ratio of the hairlike bodies is preferably 2-1,200, more preferably 10-600, and yet more preferably 40-200. By setting the aspect ratio to no less than 2, a good tactile sensation can be ensured and by setting the aspect ratio to no greater than 1,200, a good tactile sensation such as moistness, softness, and fluffiness is obtained.

Meanwhile, the average bottom surface diameter of the hairlike bodies can also be made a standard for the aspect ratio. The average bottom surface diameter of the hairlike bodies is preferably 10-150 μm. The average bottom surface diameter of the hairlike bodies is a value in which the spacing between neighboring hairlike bodies is measured at a number of locations on the resin sheet and a calculated average value of the measurements is used. The aspect ratio when the bottom surface diameter of the hairlike bodies is made the standard is preferably 0.6-120. By setting the aspect ratio to no less than 0.6, a good tactile sensation can be ensured and by setting the aspect ratio to no greater than 120, a good tactile sensation such as moistness, softness, and fluffiness is obtained.

The average spacing (t) between the hairlike bodies is preferably 20-200 μm and more preferably 40-150 μm. The spacing of the hairlike bodies means the distance from the center of the root of a hairlike body to the center of the root of a neighboring hairlike body. By setting the average spacing to no less than 20 μm, a good tactile sensation is ensured and by setting the average spacing to no greater than 200 μm, a good tactile sensation such as moistness, softness, and fluffiness is obtained. The average spacing of the hairlike bodies is a value in which the spacing between neighboring hairlike bodies is measured at a number of locations on the resin sheet and a calculated average value of the measurements is used.

The shape of the hairlike bodies is not particularly limited and may be configured to extend hairlike in a direction away from the base layer in a shape in which the hairlike bodies gradually thin approaching the tip or in which a swelling is formed at the tip. In short, the hairlike bodies may have a shape in which the cross-sectional area gradually shrinks as the hairlike bodies deviate from the base layer and then once again increases when the shape terminates. Further, the shape of the tip part of the hairlike bodies may be bud-shaped or mushroom-shaped. Moreover, the hairlike bodies may have a portion positioned at the base end extending in a direction away from the base layer, a portion that extends from the portion positioned at the base end and is curved based on a fixed curvature or a curvature that gradually changes, and furthermore, a portion that is wound in a helix shape or a spiral shape. In this case, the tip parts of the hairlike bodies may have a shape that is folded inward. By having such a shape, a better tactile sensation is expressed. Further, due to the bud-shaped or mushroom-shaped portion being hollow, a better tactile sensation is expressed. When forming a bud-shaped or mushroom-shaped portion at the hairlike tips, it is preferable that ratio of the average diameter of the width of the bud shape or mushroom shape with respect to the average diameter of the hairlike bodies be no less than 1.1. The height of the bud shape or mushroom shape is preferably no less than 7 μm. The average diameter of the hairlike bodies and the average diameter of the width and height of the bud shape or mushroom shape are measured from a scanning electron microscope photograph and the calculated average value is used. The hairlike bodies comprise a thermoplastic resin. The same resins that can be used in the base layer can be used as the thermoplastic resin.

<Resin Sheet>

In the present embodiment, the thickness of the resin sheet is the sheet thickness combining the average height of the hairlike bodies and the average thickness of the base layer. The sheet thickness is preferably 150-1,500 μm and more preferably 300-1,000 μm. By setting the thickness to no less than 150 μm, a good tactile sensation can be sufficiently ensured and by setting the thickness to no greater than 1,500 μm, manufacturing costs can be suppressed.

In the present embodiment, the "tactile sensation" means the feeling and texture of the surface of the resin sheet. When touching the surface of the resin sheet, whether comfortableness is felt is judged and, when felt, a good specific texture such as moistness, softness, or fluffiness is made the good tactile sensation. Further, the good tactile sensation can be specified by, other than a sensory evaluation of the texture, etc., the previously discussed aspect ratio, the ratio of the static friction coefficient with respect to the dynamic friction coefficient of the resin sheet, the value of the feeling of coldness or warmth to the touch, and the hardness of the resin.

The ratio of the static friction coefficient with respect to the dynamic friction coefficient of the resin sheet is preferably 1.0-10.0 and more preferably 1.8-5.0. By setting the ratio of the static friction coefficient with respect to the dynamic friction coefficient of the resin sheet to no less than 1.0, a good tactile sensation can be ensured. Further, by setting the ratio of the static friction coefficient with respect to the dynamic friction coefficient of the resin sheet to no greater than 10.0, a good tactile sensation such as moistness, softness, and fluffiness can be expressed.

Moreover, the static friction coefficient is preferably 0.2-2.0 and the dynamic friction coefficient is preferably 0.2-2.0.

The feeling of coldness or warmth to the touch of the resin sheet can be measured by measuring the heat transfer speed q-max (J/cm$^2$·sec) when in contact and a larger q-max value represents a colder feeling and a smaller q-max value represents a warmer feeling. Consequently, q-max is preferably 0.005-0.500 and more preferably 0.100-0.350. By setting the heat transfer speed of the resin sheet when in contact to no less than 0.100, a good tactile sensation such as moistness, softness, and fluffiness can be ensured. Further, by setting the heat transfer speed of the resin sheet when in contact to no greater than 0.350, a good tactile sensation such as moistness, softness, and fluffiness can be expressed.

The hardness of the resin can be measured with durometer hardness. In general, for resin hardnesses, soft resins such as elastomers are categorized into Shore hardness A type and hard resins such as PP are categorized into Shore hardness D type. The resin hardness (hardness) is preferably a hardness of 45-95 in Shore hardness A. By using a resin in the above hardness range, a good tactile sensation such as moistness, softness, and fluffiness can be expressed.

Second Embodiment

An example of the resin sheet as in the second embodiment of the present invention is a resin sheet in which a sealant resin layer (2) is formed between the base layer (1) and the substrate layer (3), as shown in FIG. 3. That is, the layer configuration of the resin sheet as in the second embodiment is, from top to bottom, the hairlike bodies and the base layer (1), the sealant resin layer (2), and the substrate layer (3). Here, the hairlike bodies are the same as those explained in the first embodiment, so explanation thereof is omitted. However, the thickness of the hairlike bodies and the base layer represented by the total of the average height of the hairlike bodies and the average thickness of the base layer is preferably 150-900 μm. By setting the thickness to no less than 150 μm, a good tactile sensation can be ensured and by setting the thickness to no greater than 900 μm, production costs can be suppressed.

<Substrate Layer>

The substrate layer is preferably a thermoplastic resin such as a styrene based resin, an olefin based resin, a polyester based resin, a nylon based resin, an acrylic based resin, or a thermoplastic elastomer. Further, when laminating, there is lamination by coextrusion molding and lamination by extrusion laminate molding or dry laminate molding using a nonoriented film or a biaxially oriented film.

Polyethylene terephthalate, polybutylene terephthalate, polyethylene-2,6-naphthalate, polymethylene terephthalate, and a polyester based resin in which, as copolymerization components, for example, a diol component such as diethylene glycol, neopentyl glycol, and polyalkylene glycol and a dicarboxylic acid component such as adipic acid, sebacic acid, phthalic acid, isophthalic acid, and 2,6-naphthalene dicarboxylic acid are copolymerized can be used as the polyester based resin.

A lactam polymer such as caprolactam and laurolactam, an aminocarboxylic acid polymer such as 6-aminocaproic acid, 11-aminoundecanoic acid, and 12-aminododecanoic acid, a polycondensate of a diamine unit such as an aliphatic diamine such as hexamethylenediamine, decamethylenediamine, dodecamethylenediamine, and 2,2,4- or 2,4,4-trimethylhexamethylenediamine, an alicyclic diamine such as 1,3- or 1,4-bis(aminomethyl)cyclohexane or bis(p-aminocyclohexylmethane), or an aromatic diamine such as m- or p-xylylenediamine, and a dicarboxylic acid unit such as an aliphatic dicarboxylic acid such as adipic acid, suberic acid, and sebacic acid, an alicyclic dicarboxylic acid such as cyclohexanedicarboxylic acid, or an aromatic dicarboxylic acid such as terephthalic acid and isophthalic acid, and copolymers, etc. thereof can be used as the nylon based resin. For example, there are nylon 6, nylon 9, nylon 11, nylon 12, nylon 66, nylon 610, nylon 611, nylon 612, nylon 6T, nylon 6I, nylon MXD6, nylon 6/66, nylon 6/610, nylon 6/6T, nylon 6I/6T, etc. and among these, nylon 6 and nylon MXD6 are suitable.

If the polymer is a vinyl polymer based on methacrylic ester monomers, it can be used as an acrylic based resin and the structure thereof is not particularly limited. As the methacrylic ester monomers, there are, for example, methyl methacrylate, ethyl methacrylate, propyl methacrylate, butyl methacrylate, pentyl methacrylate, hexyl methacrylate, etc. Further, the alkyl group such as a propyl group, butyl group, pentyl group, or hexyl group in the methacrylic ester monomer may be straight chain or may be branched. The methacrylic ester resin may be a homopolymer of a methacrylic ester monomer or a copolymer of multiple methacrylic ester monomers and may have monomer units derived from known vinyl compounds other than methacrylic ester such as ethylene, propylene, butadiene, styrene, α-methylstyrene, acrylonitrile, and acrylic acid.

The substrate layer may be alloyed with the abovementioned thermoplastic resins at any ratio in a range that does not inhibit the effects of the present invention, as necessary. Furthermore, the substrate layer may contain other additives. Additives such as water/oil repellents, colorants such as pigments or dyes, mold release agents such as silicon oil or alkyl ester based agents, fibrous reinforcement agents such as glass fibers, granular lubricants such as talc, clay, or silica, a salt compound of sulfonic acid and an alkali metal or the like, antistatic agents, ultraviolet absorbing agents, flame retardants, and antibacterial agents can be added as the other additives in a range that does not inhibit the effects of the present invention. Further, scrap resin generated in the resin sheet manufacturing process can be mixed and used.

<Sealant Resin Layer>

The sealant resin layer is to cause adhesion between the base layer and the substrate layer to be expressed and a modified olefin based resin, a hydrogenated styrene based thermoplastic elastomer, etc. can be used as resin components.

Olefin based resins such as olefins with about 2-8 carbon atoms such as ethylene, propylene, and butene-1, copolymers of these olefins and other olefins with about 2-20 carbon atoms such as ethylene, propylene, butene-1,3-methylbutene-1, pentene-1,4-methylpentene-1, hexene-1, octene-1, and decene-1 or copolymers of these olefins and vinyl compounds such as vinyl acetate, vinyl chloride, acrylic acid, methacrylic acid, acrylic ester, methacrylic ester, and styrene, and olefin based rubbers such as ethylene-propylene copolymers, ethylene-propylene-diene copolymers, ethylene-butene-1 copolymers, and propylene-butene-1 copolymers modified under graft reaction conditions with unsaturated carboxylic acids such as acrylic acid, methacrylic acid, crotonic acid, isocrotonic acid, maleic acid, fumaric acid, itaconic acid, citraconic acid, and tetrahydrophthalic acid or derivatives of the acids such as halides, amides, imides, anhydrides, and esters, specifically, malonyl chloride, maleimide, maleic anhydride, citraconic anhydride, monomethyl maleate, dimethyl maleate, and glycidyl maleate can be used as the modified olefin based resin.

Among these, an "ethylene-propylene-diene copolymer" or ethylene-propylene or butene-1 copolymer rubber modified with an unsaturated dicarboxylic acid or an anhydride thereof, in particular maleic acid or an anhydride thereof, is suitable.

A hydrogenated copolymer of a styrene based monomer and butadiene or isoprene, a hydrogenated styrene-butadiene-styrene block copolymer (styrene-ethylene/butylene-styrene block copolymer), a hydrogenated styrene-isoprene-styrene block copolymer (styrene-ethylene/propylene-styrene block copolymer), etc. can be used as the hydrogenated styrene based thermoplastic elastomer and, in particular, a styrene-ethylene/butylene-styrene block copolymer is preferable.

The average thickness of the sealant resin layer is preferably 20-90 μm and more preferably 40-80 μm. By setting the average thickness to no less than 20 μm, the occurrence of interlayer separation between the base layer and the substrate layer can be suppressed and by setting the average thickness to no greater than 90 μm, production costs can be suppressed.

Third Embodiment

Figure 4:
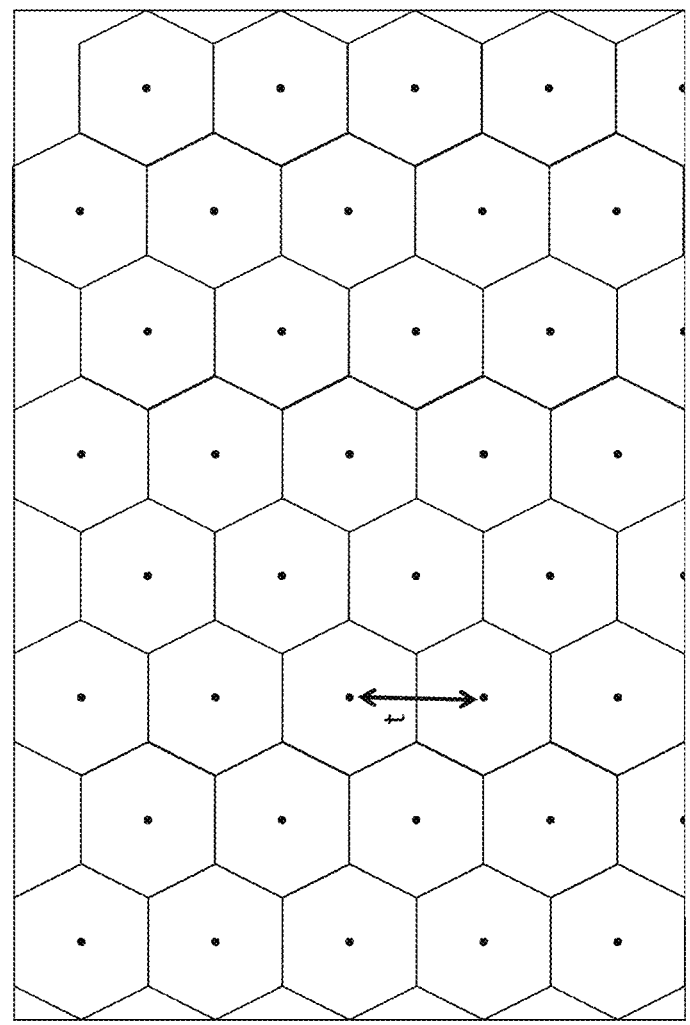
FIG. 4 is a simplified plan view of the resin sheet of FIG. 1.
Figure 5:
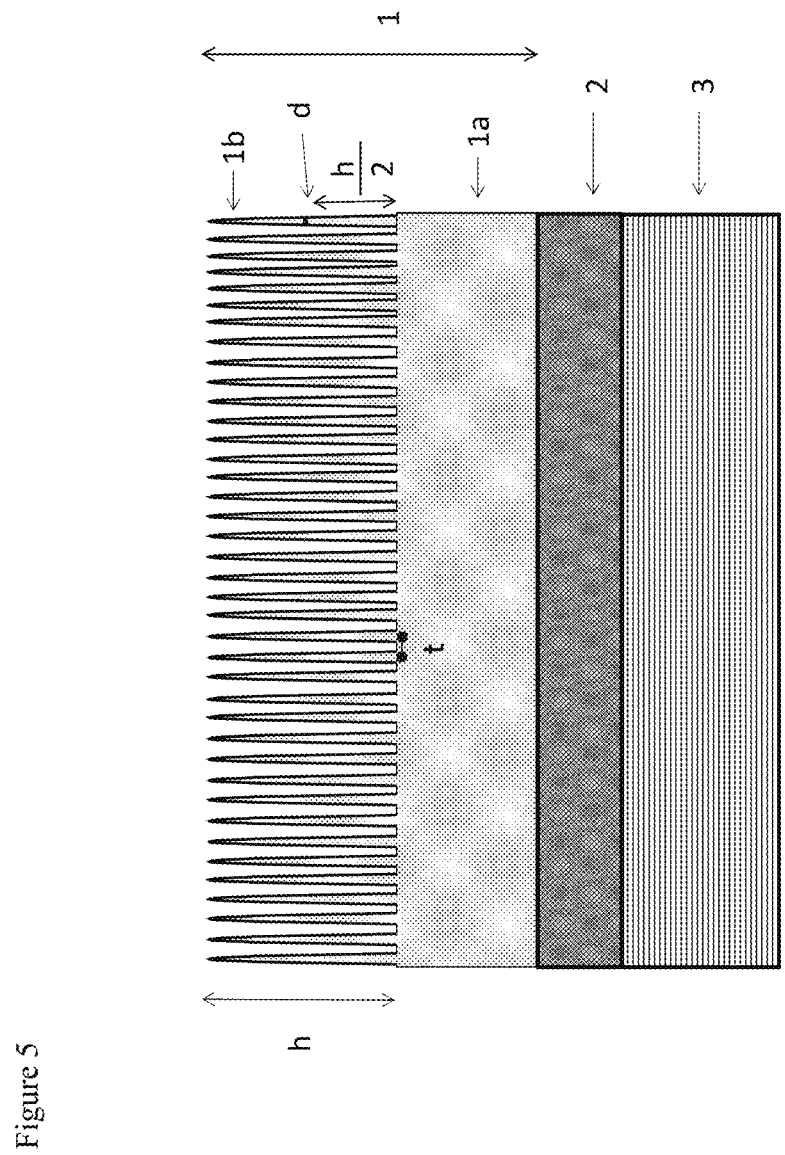
FIG. 5 is a simplified vertical side cross-sectional view showing the layer structure of a resin sheet according to the second embodiment of the present invention.
Figure 6:
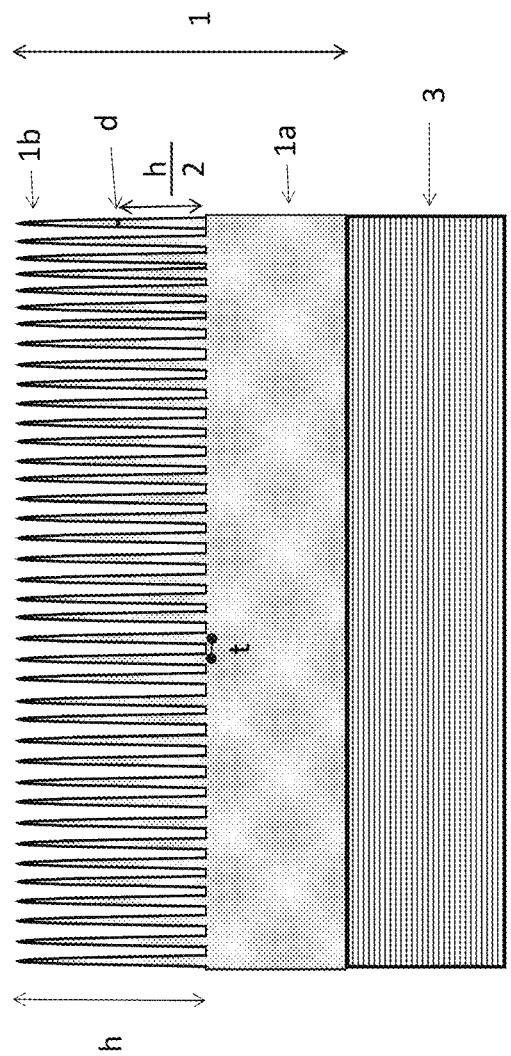
FIG. 6 is a simplified vertical side cross-sectional view showing the layer structure of a resin sheet according to the third embodiment of the present invention.

The resin sheet as in a third embodiment of the present invention is one in which the hairlike bodies and base layer (1) and the substrate layer (3) are directly laminated without using the sealant resin sheet (2) indicated in the second embodiment, as shown in FIG. 4. That is, the layer configuration of the resin sheet as in the third embodiment is, from top to bottom, the hairlike bodies and base layer (1)/the substrate layer (3) and is the layer configuration for the thermoplastic resin sheet as in the second embodiment from which the sealant resin layer has been removed. Here, the hairlike bodies and base layer are the same as those in the first embodiment and the second embodiment, so explanation thereof is omitted. Meanwhile, the substrate layer (3) in the present embodiment is preferably a layer provided with sufficient adhesion with the base layer.

Further, in the resin sheet as in the third embodiment, using a thermoplastic resin with excellent adhesion with the base layer as the substrate layer is preferable. For example, when the base layer is a fluorine based resin, an acrylic based resin can be used and when the base layer is an olefin based resin, a styrene based resin composition to which a hydrogenated styrene based thermoplastic elastomer has been added can be used. When using an impact-resistant polystyrene resin and a hydrogenated styrene based thermoplastic elastomer in combination, adding 5-10 parts by mass of the hydrogenated styrene based thermoplastic elastomer with respect to 90-95 parts by mass of the impact-resistant polystyrene resin is preferred. In this case, by setting the amount of the hydrogenated styrene based thermoplastic elastomer to no less than 5 parts by mass, adhesion with the base layer becomes sufficient and the occurrence of interlayer separation can be suppressed, and by setting the amount to no greater than 10 parts by mass, the production costs can be suppressed.

<Resin Sheet Manufacture>

The manufacturing method for the resin sheet as in the present application is not limited and may be any method, but typically comprises steps for melt-extruding a raw resin and adding the regularly arranged hairlike bodies to at least one surface of the obtained extruded resin sheet.

In the manufacture of a single layer sheet or a multilayer sheet, any resin sheet molding method can be used. For example, there are methods for melting and extruding raw resins using a single-screw extruder when the sheet is single layer and multiple single-screw extruders when the sheet is multilayer and obtaining a resin sheet with a T-die. When the sheet is multilayer, a feed block or a multi-manifold die can be used. Moreover, the layer configurations of the embodiments of the resin sheet of the present application are basically as discussed previously, but beyond these, for example, scrap material generated in a manufacturing process for the resin sheet or molded container of the present invention may be added to the substrate layer and laminated as a further layer so long as degradation of the properties, etc. is not observed.

The method for adding the hairlike bodies is not particularly limited and any method known by a person skilled in the art can be used. For example, there are a method for manufacturing using an extrusion molding technique, a method for manufacturing using a roll-to-roll technique, a method for manufacturing using a photolithography technique, a method for manufacturing using a hot pressing technique, a manufacturing method using a pattern roll and a UV curable resin, a method for manufacturing using a 3D printer, a method for covalently bonding with a polymerization reaction after embedding the hairlike bodies in the resin layer, etc.

For example, when using an extrusion molding technique, the resin sheet as in the present invention can be manufactured by extruding a resin sheet with a T-die technique and casting with a transfer roll on which a relief process has been performed and a touch roll so as to add the shapes of hairlike bodies to a surface of the resin sheet.

A roll on which a micro-relief has been applied regularly on a surface thereof with a laser engraving or electrocasting method, an etching method, a mill engraving method, etc. can be used as the transfer roll on which a relief process has been performed. Here, regular means that the relief is an arranged state that is not random, that is, is arranged in an orderly fashion in one direction or in two directions. The arrangement of the relief in an embodiment can be selected from a grid arrangement arranged vertically and horizontally, a staggered arrangement, etc. As the shape of the relief part, there are, for example, if a concavity, funnel-shapes (cone, quadrangular pyramid, triangular pyramid, hexagonal pyramid, etc.), semicircles, rectangles (quadrangular prism), etc. As the size thereof, the diameter of the opening of the concavity, the depth of the concavity, the spacing of the concavity shapes, etc. are from micrometers to hundreds of micrometers. The spacing of the hairlike bodies can be adjusted by adjusting the spacing of the concavities on the transfer roll and the height of the hairlike bodies can be adjusted by adjusting the depth of the concavities on the transfer roll, and the tactile sensation can also be adjusted thereby.

Further, it is preferable that a relief process with a high aspect ratio be performed on the transfer roll surface. For example, the aspect ratio (concavity depth/concavity opening diameter) when working concavity shapes into the transfer roll surface is preferably 0.5-6.0. In performing a high aspect ratio relief process on the transfer roll surface, in comparison with an etching method, a blasting method, a mill engraving method, etc., a laser engraving method or an electrocasting method is suitable when performing fine work in the depth direction and thus is particularly suitably used.

For example, a metal, a ceramic, etc. can be used as the material of the transfer roll. Meanwhile, various materials can be used as the touch roll, for example, a roll made from silicon based rubber, NBR based rubber, EPT based rubber, butyl rubber, chloroprene rubber, or fluorine rubber can be used. In an embodiment, a touch roll with a rubber hardness (JIS K 6253) of 40-100 can be used. Further, a teflon layer may be formed on the surface of the touch roll.

The resin sheet of the present embodiment can be manufactured by using a roll set of the above transfer roll and touch roll.

In an embodiment, the resin sheet of the present embodiment can be manufactured by adjusting the temperature of the transfer roll to near the crystal fusion temperature, the glass transition point, or the melting point of the thermoplastic resin (for example, 100-150° C. when using a random polypropylene) and casting with a pinch pressure between the transfer roll and the touch roll of 30-120 Kg/cm$^2$. The cast resin sheet is taken in at a line speed of 0.5-30 m/minute using a pinch roll, etc.

Further, while the above embodiments were shown specifically, the present invention is not limited thereto.

<Molded Product>

The molded product of the present invention is formed by molding the resin sheet of the present invention. The conventional art cannot handle three-dimensional molding, but the hairlike body sheet of the present invention comprises a thermoplastic resin, so handling of general molding is possible. As the molding method, there are general vacuum molding and pressure molding, and as applications thereof, a method for heating and softening a resin sheet in vacuum and overlaying on (molding to) a surface of an existing molded product by opening under atmospheric pressure, etc., but the molding method is not limited thereto. Further, known sheet heating methods such as radiation heating with an infrared heater or the like, which is non-contact heating, can be adapted as a method to heat and soften a sheet before molding. In vacuum/pressure molding in an embodiment, for example, a resin sheet is molded on to an existing molded product surface after heating at 60-140° C. for 20-480 seconds and can be stretched to 1.05-1.50 times depending on the surface shape.

<Product>

The resin sheet to which the hairlike bodies of the present invention are added to the surface thereof can be applied to a use requiring the good tactile sensation indicated above. For example, the resin sheet of the present invention can be applied to interior materials of automobiles, electronic device cladding, cosmetic container members, stationery members, etc.

As interior materials of automobiles, there are the portions of the automobile interior that hands touch such as the steering wheel, dashboard, levers, and switches. For example, an interior material in which the abovementioned resin sheet is attached to a known instrument panel or pillar (for example, JP 2009-184421 A) could be raised. By attaching the resin sheet, an interior material to which a good tactile sensation has been added can be configured. As the material of the resin sheet to be attached, in consideration of weather resistance and chemical resistance, an olefin based resin, a vinyl chloride based resin, or a urethane based elastomer is preferable. The method for attaching the resin sheet and the interior material is not particularly limited.

As electronic device cladding, there are transmitter housings for keyless entry systems, smartphone housings, smartphone cases, music player cases, game console housings, digital camera housings, electronic notebook housings, calculator housings, tablet housings, mobile computer housings, keyboards, mice, etc. For example, in a known portable transmitter housing for a keyless entry system (for example, JP 2005-228911 A), a portable transmitter to which the resin sheet of the present application has been attached could be raised. By attaching the resin sheet, a portable transmitter to which a good tactile sensation has been added can be configured. As the material of the resin sheet to be attached, an olefin based resin or a urethane based elastomer is preferable. The method for attaching the resin sheet and the housing is not particularly limited.

As a cosmetic container member, there are containers for face cream, pack cream, foundation, and eyeshadow and, for example, a cosmetic container in which the resin sheet of the present application has been attached to a lid member of a known container for foundation (JP 2017-29608 A) could be raised. By attaching the resin sheet, a cosmetic container to which a good tactile sensation has been added can be configured. As the material of the resin sheet to be attached, an olefin based resin or a urethane based elastomer is preferable. The method for attaching the resin sheet is not particularly limited.

As a stationery member, there are book covers, notebook covers, pen case covers, etc. and, for example, a book cover to which a good tactile sensation and waterproofing has been added could be configured by manufacturing a known book cover (for example, JP 2007-246122 A) using the sheet of the present invention. Further, the aspect of the book cover is not particularly limited. As the material of the sheet, an olefin based resin or a urethane based elastomer is preferable. The method for manufacturing using the resin sheet is not particularly limited.

Furthermore, a hairlike body sheet in which words or a pattern are printed on the surface of the hairlike bodies with a general printing method (an offset printing method, a gravure printing method, a flexographic printing method, a screen printing method, foil stamping, etc.) can be manufactured and applied to the above use. The material of the resin sheet to be printed on is not particularly limited, but it is preferable that the printability of the ink used in printing be considered.

Further, a laminated body in which the resin sheet of the present invention is laminate molded (dry laminate molded or extrusion laminate molded) with a printed article on which words, a pattern, etc. are printed (such as paper or a metal thin film) or a non-woven cloth, etc. can be manufactured, for example, a business card with a tactile sensation can be manufactured by laminate molding to the printing surface of the business card. The material of the resin sheet to be laminated is not particularly limited.

EXAMPLES

The present invention shall be explained in more detail below using examples and comparative examples, but the present invention is not at all limited by the details of the examples, etc.

The raw materials used in the examples, etc. are as follows.
(1) Hairlike Bodies and Base Layer
(A-1) Random PP "PM822V" (manufactured by SunAllomer Ltd.)
(A-2) Block PP "PM854X" (manufactured by SunAllomer Ltd.)
(B-1) Straight chain medium density PE (C4) "Neozex 45200" (manufactured by Prime Polymer Co., Ltd.)
(B-2) Straight chain low density PE (C6) "Ultrazex 20200J" (manufactured by Prime Polymer Co., Ltd.)
(C) Styrene based thermoplastic elastomer "SE Polymer AC15" (manufactured by Denka Company Limited)
(D) PVC "BFV7070N" (manufactured by RIKEN TECHNOS CORP.)
(E) PVDF "Kynar 720" (manufactured by ARKEMA K.K.)
(F-1) TPU (urethane based elastomer) "ET880: Polyether" (manufactured by BASF SE)
(F-2) TPU (urethane based elastomer) "ET680: Polyester" (manufactured by BASF SE)
(G) Colorant "PE-M-SAC GW1060 White" (manufactured by Dainichiseika Color & Chemicals Mfg. Co., Ltd.)
(H) Colorant "PE-M-MD1697 Red" (manufactured by Dainichiseika Color & Chemicals Mfg. Co., Ltd.)
(I) Colorant "PE-M-MC6164 Yellow" (manufactured by Dainichiseika Color & Chemicals Mfg. Co., Ltd.)
(J) Colorant "PEX 1AG057 PEARL" (manufactured by TOKYO PRINTING INK MFG CO., LTD.)
(K) Colorant "PEX 496 SILVER AL" (manufactured by TOKYO PRINTING INK MFG CO., LTD.)
(L-1) Colorant "Elastollan Master Color Black 590M50" (manufactured by FCI Co., Ltd.)
(L-2) Colorant "Elastollan Master Color White 880M50" (manufactured by FCI Co., Ltd.)
(M) Water repellent "Clinbell CB50-PP" (manufactured by Fuji Chemical Industries, Ltd.)
(N) Antistatic agent "Pelestat 230" (manufactured by Sanyo Chemical Industries, Ltd.)
(O) Antibacterial agent "Bactekiller BM102VT" (manufactured by Fuji Chemical Industries, Ltd.)
(P) Mold release agent "Elastollan Master V" (manufactured by FCI Co., Ltd.)
(2) Sealant Resin Layer
(Q) Hydrogenated styrene based thermoplastic elastomer "Tuftec M1943" (manufactured by Asahi Kasei Corporation)
(R) Modified olefin based polymer resin "MODIC F502" (manufactured by Mitsubishi Chemical Corporation)
(S) Modified olefin based polymer resin "ADMER SE810" (manufactured by Mitsui Chemicals, Inc.)
(T) Hydrogenated styrene based thermoplastic elastomer "Tuftec P2000" (manufactured by Asahi Kasei Corporation)
(3) Substrate Layer
(U) HIPS "Toyo Styrol H850N" (manufactured by TOYO-STYRENE CO., LTD., butadiene content: 9.0 mass %)
(V) GPPS "HRM23" (manufactured by TOYO-STYRENE CO., LTD.)
(W) PET film "Lumirror" (manufactured by TORAY INDUSTRIES, INC.)
(W-1) PET resin "TRN-8550FF" (manufactured by TEIJIN LIMITED)
(X) Nylon 6 film "Harden" (manufactured by TOYOBO CO., LTD.)
(X-1) Nylon 6 resin "1022B" (manufactured by UBE INDUSTRIES, LTD.)
(Y) PMMA "HBS000" (manufactured by Mitsubishi Chemical Corporation)

The evaluation methods for the various characteristics of the resin sheets and the molded products to which the resin sheets are vacuum/pressure molded manufactured in the examples and comparative examples are as follows.

(1) Average Height of the Hairlike Bodies, Average Diameter of the Hairlike Bodies, Average Spacing of the Hairlike Bodies, and Average Thickness of the Base Layer The height (h) of the hairlike bodies, the diameter (d) of the hairlike bodies, the spacing (t) of the hairlike bodies, and the thickness of the base layer of the resin sheet were measured using a laser microscope VK-X100 (manufactured by KEYENCE CORPORATION). The measured samples were cross-sectional slices cut from the resin sheets at three random locations with a microtome. The average height of the hairlike bodies was measured by measuring the height of 10 hairlike bodies of each sample and calculating the average value of the 30 measurements. The average diameter of the hairlike bodies was measured by measuring the diameter of 10 hairlike bodies of each sample at mid-height (h/2) and calculating the average value of the 30 measurements. The average spacing of the hairlike bodies was measured by measuring the distance from the center of the root of one hairlike body to the center of the root of a neighboring hairlike body at 10 locations of each sample and calculating the average value of the 30 measurements. The average thickness of the base layer was measured by measuring the thickness from the roots of the hairlike bodies to the other layer interface at 10 locations of each sample and calculating the average value of the 30 measurements.

(2) Good Tactile Sensation Sensory Evaluation

A functional evaluation of the good tactile sensation was performed by having a total of 30 people, 15 men and 15 women, touch the resin sheets. When touching the surfaces of the resin sheets, whether comfortableness was felt was judged with "○" and "x", when judged with "○", the resin sheet was evaluated with a specific texture such as moistness, softness, or fluffiness. When evaluated with the same texture by no less than 80% of the evaluators, the resin sheet was evaluated as having that texture. Further, whether the same texture was also maintained on the surface of the molded products which were vacuum/pressure molded using the resin sheets was evaluated.

(3) Ratio of Static Friction Coefficient with Respect to the Dynamic Friction Coefficient Using a static friction measurement instrument "TL201 Ts (manufactured by Trinity-Lab Inc.), the resin sheets were attached to the table thereof with the surface to which the hairlike bodies were added facing up. Using a contact made of urethane (durometer hardness: 32±2), the table was moved at a speed of 10 mm/second while applying a load of 100 g and the static friction coefficient and the dynamic friction coefficient were measured.

(4) Measuring Coldness or Warmth to the Touch (Heat Transfer Speed: q-Max)

Using a finger robot thermolab (manufactured by KATO TECH CO., LTD.), the resin sheet samples were placed on the sample stage set to 20° C. for 5 minutes and after temperature adjustment of the resin sheets, contacted with a 30° C. contact temperature sensor (1 mm×1.5 mm), and the heat transfer speed (q-max) was measured over 0.2 seconds.

(5) Resin Hardness

The hardness of the resins was measured in accordance with JIS K 7215 by manufacturing samples having a thickness of 6 mm, a width of 25 mm, and a length of 50 mm with a hot pressing method and measuring using a type A durometer.

(6) Contact Angle

The contact angle of the resin sheets was measured using an automatic contact angle meter DM-501 (manufactured by Kyowa Interface Science, Inc.). Further, purified water was used as the test liquid and the drop amount was set to 6 μL. If the contact angle was 120° or greater, the liquid repellency was high and the resin was judged to be capable of preventing the adhesion of liquids.

(7) Surface Resistivity

The surface resistivity of the surfaces of the resin sheets was measured in accordance with JIS K 6911 at an atmospheric temperature of 23° C., an atmospheric humidity of 50% R.H., and an applied voltage of 1,000 V.

(8) Antibacterial Evaluation

Evaluation was performed with a film adhesion method in accordance with JIS K 2801. Various bacterial liquids were dropped onto a film surface 5 cm×5 cm with a thickness no greater than 1 mm and the number of living bacteria was measured after the surface was covered with a polyethylene film and stored at 35° C.

(9) Vacuum/Pressure Molding

The resin sheets were heated in vacuum with a double-sided vacuum molding machine (NGF-0709-S: manufactured by Fu-Se Vacuum Forming) and then a molded product was manufactured by vacuum/pressure molding the resin sheets to a surface of a smartphone cover prepared in atmosphere. The sheets were heated at 80° C. for 120 seconds and stretched to 1.5 times at the most stretched location.

Examples 1, 2, 7, and 10-12

Resin sheets with the compositions and thicknesses shown in Table 1 and in which one surface has the surface shapes shown in Table 2 were obtained by using a 65 mm single screw-extruder, extruding resin sheets with a T-die method and, so as to add a hairlike body shape to a surface of these resin sheets, taking in at a line speed of 2-15 m/minute using a pinch roll by casting using a metal transfer roll on which a relief process had been performed with a laser engraving method and which was adjusted to 100-150° C. and a silicon based rubber touch roll having a rubber hardness of 70 which was adjusted to 10-90° C.

Example 3

A three-layer resin sheet in which the layers have the compositions and thicknesses shown in Table 1 and one surface has the surface shape shown in Table 2 was obtained by using three 40 mm single-screw extruders and a feed block, extruding a three-layer resin sheet with a T-die method and, so as to add a hairlike body shape to a surface of the resin sheet, casting with a transfer roll on which a relief process had been performed with an electrocasting method and a touch roll.

Examples 4 and 13-16

Three-layer resin sheets in which the layers have the compositions and thicknesses shown in Table 1 and one surface has the surface shape shown in Table 2 were obtained similarly to Example 3, using a transfer roll with a different size relief shape.

Examples 5, 17, and 18

Resin sheets with the compositions and thicknesses shown in Table 1 and in which one surface has the surface shape shown in Table 2 were obtained by, so as to add a hairlike body shape to a surface of the resin sheets, fabricating a 100 mm square mold in which a relief process had been performed with an electrocasting method and hot pressing an already-fabricated resin sheet using an electrothermal press.

Example 6

A two-layer resin sheet in which the layers have the compositions and thicknesses shown in Table 1 and one surface has the surface shape shown in Table 2 was obtained by using two 40 mm single-screw extruders and a feed block, extruding a two-layer resin sheet with a T-die method and, so as to add a hairlike body shape to a surface of the resin sheet, casting with a transfer roll on which a relief process had been performed with an electrocasting method and a touch roll.

Example 8

A three-layer resin sheet in which the layers have the compositions and thicknesses shown in Table 1 and one surface has the surface shape shown in Table 2 was obtained by obtaining a three-layer resin sheet with a laminate molding method and, so as to add a hairlike body shape to a surface of the resin sheet, casting with a transfer roll on which a relief process had been performed with an electrocasting method and a touch roll.

Example 9

A three-layer resin sheet in which the layers have the compositions and thicknesses shown in Table 1 and one surface has the surface shape shown in Table 2 was obtained on the basis of Example 8 using a transfer roll with a different size relief shape.

Comparative Example 1

A resin sheet with the composition and thickness shown in Table 1 in which one surface has an embossed shape in which Rz (ten point average roughness) is 55 μm was obtained on the basis of Example 6 using, so as to add an embossed shape to a surface of the resin sheet, a transfer roll on which a relief process had been performed with a blasting method.

Comparative Example 2

A three-layer resin sheet in which the layers have the compositions and thicknesses shown in Table 1 and a surface has the surface shape shown in Table 2 was obtained on the basis of Example 3 by, so as to add a bell-like convex shape to a surface of the resin sheet, using a transfer roll on which a relief process had been performed with an etching method.

Comparative Example 3

A resin sheet with the composition and thickness shown in Table 1 and in which one surface has the surface shape shown in Table 2 was obtained on the basis of Example 1 by, so as to add a quadrangular pyramid-like concave shape to a surface of the resin sheet, using a transfer roll on which a relief process had been performed with an electrocasting method.

Comparative Example 4

A resin sheet with the composition and thickness shown in Table 1 and in which both surfaces have a smooth shape was obtained on the basis of Example 1 using a roll on which a relief process had not been performed in place of the transfer roll.

Comparative Example 5

A three-layer resin sheet in which the layers have the compositions and thicknesses shown in Table 1 and one surface has the surface shape shown in Table 2 was obtained on the basis of Example 8 by, so as to add a hexagonal pyramid-like convex shape to a surface of the resin sheet, using a transfer roll on which a relief process had been performed with an electrocasting method.

Evaluative testing of the characteristics was performed using the resin sheets obtained in the examples and comparative examples and molded products to which the resin sheets had been vacuum/pressure molded and the results are shown in Table 2.

TABLE 1

| | | (A-1) Random PP | (A-2) Block PP | (B-1) PE | (B-1) PE | (C) Styrene Thermoplastic Elastomer | (D) PVC | (E) PVDF | (F-1) TPU | (F-2) TPU | (W-1) PET | (X-1) Nylon 6 |
|---|---|---|---|---|---|---|---|---|---|---|---|---|
| Example 1 | Composition (mass %) | 100 | — | — | — | — | — | — | — | — | — | — |
| | Thickness (μm) | 390 (Average Height of Hairlike Bodies + Average Thickness of Underlayer) | | | | | | | | | | |
| Example 2 | Composition (mass %) | — | 100 | — | — | — | — | — | — | — | — | — |
| | Thickness (μm) | 480 (Average Height of Hairlike Bodies + Average Thickness of Underlayer) | | | | | | | | | | |
| Example 3 | Composition (mass %) | — | — | 76 | — | 20 | — | — | — | — | — | — |
| | Thickness (μm) | 620 (Average Height of Hairlike Bodies + Average Thickness of Underlayer) | | | | | | | | | | |
| Example 4 | Composition (mass %) | — | — | — | 76 | 20 | — | — | — | — | — | — |
| | Thickness (μm) | 640 (Average Height of Hairlike Bodies + Average Thickness of Underlayer) | | | | | | | | | | |
| Example 5 | Composition (mass %) | — | — | — | — | — | 100 | — | — | — | — | — |
| | Thickness (μm) | 690 (Average Height of Hairlike Bodies + Average Thickness of Underlayer) | | | | | | | | | | |
| Example 6 | Composition (mass %) | — | — | — | — | — | — | 96 | — | — | — | — |
| | Thickness (μm) | 700 (Average Height of Hairlike Bodies + Average Thickness of Underlayer) | | | | | | | | | | |
| Example 7 | Composition (mass %) | — | — | — | — | — | — | 100 | — | — | — | — |
| | Thickness (μm) | 700 (Average Height of Hairlike Bodies + Average Thickness of Underlayer) | | | | | | | | | | |
| Example 8 | Composition (mass %) | — | 80 | — | — | 20 | — | — | — | — | — | — |
| | Thickness (μm) | 530 (Average Height of Hairlike Bodies + Average Thickness of Underlayer) | | | | | | | | | | |
| Example 9 | Composition (mass %) | — | — | 80 | — | — | — | — | — | — | — | — |
| | Thickness (μm) | 810 (Average Height of Hairlike Bodies + Average Thickness of Underlayer) | | | | | | | | | | |
| Example 10 | Composition (mass %) | — | — | 80 | — | — | — | — | — | — | — | — |
| | Thickness (μm) | 800 (Average Height of Hairlike Bodies + Average Thickness of Underlayer) | | | | | | | | | | |
| Example 11 | Composition (mass %) | — | — | 81 | — | — | — | — | — | — | — | — |
| | Thickness (μm) | 900 (Average Height of Hairlike Bodies + Average Thickness of Underlayer) | | | | | | | | | | |

TABLE 1-continued

| | | (G) Colorant White | (H) Colorant Red | (I) Colorant Yellow | (J) Colorant PEARL | (K) Colorant SILVER | (L-1) Colorant Black | (L-2) Colorant White | (M) Water Repellent | (N) Antistatic Agent | (O) Antibacterial | (P) Mold Release Agent |
|---|---|---|---|---|---|---|---|---|---|---|---|---|
| Example 12 | Composition (mass %) | — | — | 89 | — | — | — | — | — | — | — | — |
| | Thickness (μm) | 850 (Average Height of Hairlike Bodies + Average Thickness of Underlayer) | | | | | | | | | | |
| Example 13 | Composition (mass %) | — | — | — | — | — | — | 100 | — | — | — | — |
| | Thickness (μm) | 400 (Average Height of Hairlike Bodies + Average Thickness of Underlayer) | | | | | | | | | | |
| Example 14 | Composition (mass %) | — | — | — | — | — | — | 100 | — | — | — | — |
| | Thickness (μm) | 400 (Average Height of Hairlike Bodies + Average Thickness of Underlayer) | | | | | | | | | | |
| Example 15 | Composition (mass %) | — | — | — | — | — | — | 94 | — | — | — | — |
| | Thickness (μm) | 400 (Average Height of Hairlike Bodies + Average Thickness of Underlayer) | | | | | | | | | | |
| Example 16 | Composition (mass %) | — | — | — | — | — | — | — | 94 | — | — | — |
| | Thickness (μm) | 400 (Average Height of Hairlike Bodies + Average Thickness of Underlayer) | | | | | | | | | | |
| Example 17 | Composition (mass %) | — | — | — | — | — | — | — | — | — | 100 | — |
| | Thickness (μm) | 690 (Average Height of Hairlike Bodies + Average Thickness of Underlayer) | | | | | | | | | | |
| Example 18 | Composition (mass %) | — | — | — | — | — | — | — | — | — | — | 100 |
| | Thickness (μm) | 690 (Average Height of Hairlike Bodies + Average Thickness of Underlayer) | | | | | | | | | | |

Hairlike Bodies and Underlayer (Cont.)

| | | (G) Colorant White | (H) Colorant Red | (I) Colorant Yellow | (J) Colorant PEARL | (K) Colorant SILVER | (L-1) Colorant Black | (L-2) Colorant White | (M) Water Repellent | (N) Antistatic Agent | (O) Antibacterial | (P) Mold Release Agent |
|---|---|---|---|---|---|---|---|---|---|---|---|---|
| Example 1 | Composition (mass %) | — | — | — | — | — | — | — | — | — | — | — |
| | Thickness (μm) | 390 (Average Height of Hairlike Bodies + Average Thickness of Underlayer) | | | | | | | | | | |
| Example 2 | Composition (mass %) | — | — | — | — | — | — | — | — | — | — | — |
| | Thickness (μm) | 480 (Average Height of Hairlike Bodies + Average Thickness of Underlayer) | | | | | | | | | | |
| Example 3 | Composition (mass %) | 2 | — | 2 | — | — | — | — | — | — | — | — |
| | Thickness (μm) | 620 (Average Height of Hairlike Bodies + Average Thickness of Underlayer) | | | | | | | | | | |
| Example 4 | Composition (mass %) | 2 | 2 | — | — | — | — | — | — | — | — | — |
| | Thickness (μm) | 640 (Average Height of Hairlike Bodies + Average Thickness of Underlayer) | | | | | | | | | | |
| Example 5 | Composition (mass %) | — | — | — | — | — | — | — | — | — | — | — |
| | Thickness (μm) | 690 (Average Height of Hairlike Bodies + Average Thickness of Underlayer) | | | | | | | | | | |
| Example 6 | Composition (mass %) | 2 | — | 2 | — | — | — | — | — | — | — | — |
| | Thickness (μm) | 700 (Average Height of Hairlike Bodies + Average Thickness of Underlayer) | | | | | | | | | | |
| Example 7 | Composition (mass %) | — | — | — | — | — | — | — | — | — | — | — |
| | Thickness (μm) | 700 (Average Height of Hairlike Bodies + Average Thickness of Underlayer) | | | | | | | | | | |
| Example 8 | Composition (mass %) | 2 | 2 | — | — | — | — | — | — | — | — | — |
| | Thickness (μm) | 530 (Average Height of Hairlike Bodies + Average Thickness of Underlayer) | | | | | | | | | | |
| Example 9 | Composition (mass %) | — | — | — | 20 | — | — | — | — | — | — | — |
| | Thickness (μm) | 810 (Average Height of Hairlike Bodies + Average Thickness of Underlayer) | | | | | | | | | | |
| Example 10 | Composition (mass %) | — | — | — | 10 | — | — | — | 10 | — | — | — |
| | Thickness (μm) | 800 (Average Height of Hairlike Bodies + Average Thickness of Underlayer) | | | | | | | | | | |
| Example 11 | Composition (mass %) | 2 | — | 2 | — | — | — | — | 15 | — | — | — |
| | Thickness (μm) | 900 (Average Height of Hairlike Bodies + Average Thickness of Underlayer) | | | | | | | | | | |

TABLE 1-continued

| | | | | | | | | | | | | |
|---|---|---|---|---|---|---|---|---|---|---|---|---|
| Example 12 | Composition (mass %) | — | — | — | 10 | — | — | — | — | — | 1 | — |
| | Thickness (μm) | 850 (Average Height of Hairlike Bodies + Average Thickness of Underlayer) | | | | | | | | | | |
| Example 13 | Composition (mass %) | — | — | — | — | — | — | — | — | — | — | — |
| | Thickness (μm) | 400 (Average Height of Hairlike Bodies + Average Thickness of Underlayer) | | | | | | | | | | |
| Example 14 | Composition (mass %) | — | — | — | — | — | — | — | — | — | — | — |
| | Thickness (μm) | 400 (Average Height of Hairlike Bodies + Average Thickness of Underlayer) | | | | | | | | | | |
| Example 15 | Composition (mass %) | — | — | — | — | — | — | 3 | — | — | — | 3 |
| | Thickness (μm) | 400 (Average Height of Hairlike Bodies + Average Thickness of Underlayer) | | | | | | | | | | |
| Example 16 | Composition (mass %) | — | — | — | — | — | 3 | — | — | — | — | 3 |
| | Thickness (μm) | 400 (Average Height of Hairlike Bodies + Average Thickness of Underlayer) | | | | | | | | | | |
| Example 17 | Composition (mass %) | — | — | — | — | — | — | — | — | — | — | — |
| | Thickness (μm) | 690 (Average Height of Hairlike Bodies + Average Thickness of Underlayer) | | | | | | | | | | |
| Example 18 | Composition (mass %) | — | — | — | — | — | — | — | — | — | — | — |
| | Thickness (μm) | 690 (Average Height of Hairlike Bodies + Average Thickness of Underlayer) | | | | | | | | | | |

| | | Sealant Layer | | | | Substrate Layer | | | | | |
|---|---|---|---|---|---|---|---|---|---|---|---|
| | | (Q) Hydrogenated Styrene Thermoplastic Elastomer | (R) Modified Olefin Polymer Resin | (S) Modified Olefin Polymer Resin | (T) Hydrogenated Styrene Thermoplastic Elastomer | (U) HIPS | (V) GPPS | (W) PET Film | (X) Nylon 6 Film | (Y) PMMA | (T) Hydrogenated Styrene Thermoplastic Elastomer |
| Example 1 | Composition (mass %) | — | — | — | — | — | — | — | — | — | — |
| | Thickness (μm) | | — | | | | | | — | | |
| Example 2 | Composition (mass %) | — | — | — | — | — | — | — | — | — | — |
| | Thickness (μm) | | — | | | | | | — | | |
| Example 3 | Composition (mass %) | 100 | — | — | — | 50 | 50 | — | — | — | — |
| | Thickness (μm) | | 30 | | | | | | 150 | | |
| Example 4 | Composition (mass %) | — | 100 | — | — | 50 | 50 | — | — | — | — |
| | Thickness (μm) | | 30 | | | | | | 150 | | |
| Example 5 | Composition (mass %) | — | — | — | — | — | — | — | — | — | — |
| | Thickness (μm) | | — | | | | | | — | | |
| Example 6 | Composition (mass %) | — | — | — | — | — | — | — | — | 100 | — |
| | Thickness (μm) | | — | | | | | | 100 | | |
| Example 7 | Composition (mass %) | — | — | — | — | — | — | — | — | — | — |
| | Thickness (μm) | | — | | | | | | | | |
| Example 8 | Composition (mass %) | — | — | 100 | — | — | — | 100 | — | — | — |
| | Thickness (μm) | | 20 | | | | | | 16 | | |
| Example 9 | Composition (mass %) | — | — | 100 | — | — | — | — | 100 | — | — |
| | Thickness (μm) | | 20 | | | | | | 25 | | |
| Example 10 | Composition (mass %) | — | — | — | — | — | — | — | — | — | — |
| | Thickness (μm) | | — | | | | | | — | | |

TABLE 1-continued

| | | (A-1) Random PP | (A-2) Block PP | (B-1) PE | (B-1) PE | (C) Styrene Thermoplastic Elastomer | (D) PVC | (E) PVDF | (F-1) TPU | (F-2) TPU | (W-1) PET | (X-1) Nylon 6 |
|---|---|---|---|---|---|---|---|---|---|---|---|---|
| Example 11 | Composition (mass %) | — | — | — | — | — | — | — | — | — | — | — |
| | Thickness (μm) | | | | — | | | | | — | | |
| Example 12 | Composition (mass %) | — | — | — | — | — | — | — | — | — | — | — |
| | Thickness (μm) | | | | — | | | | | — | | |
| Example 13 | Composition (mass %) | 70 | — | — | 30 | 50 | 45 | — | — | — | — | 5 |
| | Thickness (μm) | | | 30 | | | | 170 | | | | |
| Example 14 | Composition (mass %) | 70 | — | — | 30 | 50 | 45 | — | — | — | — | 5 |
| | Thickness (μm) | | | 30 | | | | 170 | | | | |
| Example 15 | Composition (mass %) | 70 | — | — | 30 | 50 | 45 | — | — | — | — | 5 |
| | Thickness (μm) | | | 30 | | | | 170 | | | | |
| Example 16 | Composition (mass %) | 70 | — | — | 30 | 50 | 45 | — | — | — | — | 5 |
| | Thickness (μm) | | | 30 | | | | 170 | | | | |
| Example 17 | Composition (mass %) | — | — | — | — | — | — | — | — | — | — | — |
| | Thickness (μm) | | | | — | | | | | — | | |
| Example 18 | Composition (mass %) | — | — | — | — | — | — | — | — | — | — | — |
| | Thickness (μm) | | | | — | | | | | — | | |

Hairlike Bodies and Underlayer

| | | (A-1) Random PP | (A-2) Block PP | (B-1) PE | (B-1) PE | (C) Styrene Thermoplastic Elastomer | (D) PVC | (E) PVDF | (F-1) TPU | (F-2) TPU | (W-1) PET | (X-1) Nylon 6 |
|---|---|---|---|---|---|---|---|---|---|---|---|---|
| Comparative Example 1 | Composition (mass %) | — | — | — | — | — | — | 100 | — | — | — | — |
| | Thickness (μm) | | | 400 (Average Thickness of Sheet) | | | | | | | | |
| Comparative Example 2 | Composition (mass %) | 50 | — | 50 | — | — | — | — | — | — | — | — |
| | Thickness (μm) | | | 388 (Average Height of Convex Shape + Average Thickness of Underlayer) | | | | | | | | |
| Comparative Example 3 | Composition (mass %) | 100 | — | — | — | — | — | — | — | — | — | — |
| | Thickness (μm) | | | 250 (Average Thickness of Sheet) | | | | | | | | |
| Comparative Example 4 | Composition (mass %) | — | — | — | — | — | 100 | — | — | — | — | — |
| | Thickness (μm) | | | 300 (Average Thickness of Sheet) | | | | | | | | |
| Comparative Example 5 | Composition (mass %) | — | 100 | — | — | — | — | — | — | — | — | — |
| | Thickness (μm) | | | 488 (Average Height of Convex Shape + Average Thickness of Underlayer) | | | | | | | | |

Hairlike Bodies and Underlayer (Cont.)

| | | (G) Colorant White | (H) Colorant Red | (I) Colorant Yellow | (J) Colorant PEARL | (K) Colorant SILVER | (L-1) Colorant Black | (L-2) Colorant White | (M) Water Repellent | (N) Antistatic Agent | (O) Antibacterial | (P) Mold Release Agent |
|---|---|---|---|---|---|---|---|---|---|---|---|---|
| Comparative Example 1 | Composition (mass %) | — | — | — | — | — | — | — | — | — | — | — |
| | Thickness (μm) | | | 400 (Average Thickness of Sheet) | | | | | | | | |
| Comparative Example 2 | Composition (mass %) | — | — | — | — | — | — | — | — | — | — | — |
| | Thickness (μm) | | | 388 (Average Height of Convex Shape + Average Thickness of Underlayer) | | | | | | | | |

TABLE 1-continued

| | | | | | | | | | | | |
|---|---|---|---|---|---|---|---|---|---|---|---|
| Comparative Example 3 | Composition (mass %) | — | — | — | — | — | — | — | — | — | — |
| | Thickness (μm) | 250 (Average Thickness of Sheet) | | | | | | | | | |
| Comparative Example 4 | Composition (mass %) | — | — | — | — | — | — | — | — | — | — |
| | Thickness (μm) | 300 (Average Thickness of Sheet) | | | | | | | | | |
| Comparative Example 5 | Composition (mass %) | — | — | — | — | — | — | — | — | — | — |
| | Thickness (μm) | 488 (Average Height of Convex Shape + Average Thickness of Underlayer) | | | | | | | | | |

| | | Sealant Layer | | | | Substrate Layer | | | | | |
|---|---|---|---|---|---|---|---|---|---|---|---|
| | | (Q) Hydrogenated Styrene Thermoplastic Elastomer | (R) Modified Olefin Polymer Resin | (S) Modified Olefin Polymer Resin | (T) Hydrogenated Styrene Thermoplastic Elastomer | (U) HIPS | (V) GPPS | (W) PET Film | (X) Nylon 6 Film | (Y) PMMA | (T) Hydrogenated Styrene Thermoplastic Elastomer |
| Comparative Example 1 | Composition (mass %) | — | — | — | — | — | — | — | — | 100 | — |
| | Thickness (μm) | | — | | | | | | 200 | | |
| Comparative Example 2 | Composition (mass %) | 100 | — | — | — | 50 | 50 | — | — | — | — |
| | Thickness (μm) | | 20 | | | | | | 200 | | |
| Comparative Example 3 | Composition (mass %) | — | — | — | — | — | — | — | — | — | — |
| | Thickness (μm) | | — | | | | | | — | | |
| Comparative Example 4 | Composition (mass %) | — | — | — | — | — | — | — | — | — | — |
| | Thickness (μm) | | — | | | | | | — | | |
| Comparative Example 5 | Composition (mass %) | — | — | 100 | — | — | — | 100 | — | — | — |
| | Thickness (μm) | | 20 | | | | | | 200 | | |

TABLE 2

| | Resin Sheet Evaluation | | | | | | | |
|---|---|---|---|---|---|---|---|---|
| | Surface Shape | | | | | Good Tactile Sensation | | |
| | Average Height of the Hairlike Bodies (μm) | Average Diameter of the Hairlike Bodies (μm) | Average Spacing of the Hairlike Bodies (μm) | Average Thickness of the Underlayer (μm) | Hairlike Body Arrangement | "Comfort" when Touched | Texture when "Comfort" was Felt | Texture on a Molded Article |
| Example 1 | 250 | 22 | 30 | 140 | Staggered Arrangement | ○ | Soft | Soft |
| Example 2 | 300 | 20 | 30 | 180 | Staggered Arrangement | ○ | Soft | Soft |
| Example 3 | 450 | 10 | 60 | 170 | Staggered Arrangement | ○ | Fluffy | Fluffy |
| Example 4 | 460 | 10 | 60 | 180 | Staggered Arrangement | ○ | Fluffy | Fluffy |
| Example 5 | 290 | 20 | 30 | 400 | Staggered Arrangement | ○ | Soft | Soft |
| Example 6 | 400 | 11 | 100 | 300 | Staggered Arrangement | ○ | Soft | Soft |
| Example 7 | 420 | 10 | 100 | 280 | Staggered Arrangement | ○ | Soft | Soft |
| Example 8 | 330 | 19 | 60 | 200 | Staggered Arrangement | ○ | Soft | Soft |
| Example 9 | 510 | 8 | 100 | 300 | Staggered Arrangement | ○ | Fluffy | Fluffy |
| Example 10 | 500 | 8 | 60 | 300 | Staggered Arrangement | ○ | Fluffy | Fluffy |

TABLE 2-continued

| | | | | | | | | |
|---|---|---|---|---|---|---|---|---|
| Example 11 | 650 | 6 | 60 | 250 | Staggered Arrangement | ○ | Fluffy | Fluffy |
| Example 12 | 550 | 7 | 60 | 300 | Staggered Arrangement | ○ | Fluffy | Fluffy |
| Example 13 | 290 | 22 | 60 | 110 | Staggered Arrangement | ○ | Moist | Moist |
| Example 14 | 250 | 20 | 30 | 150 | Staggered Arrangement | ○ | Moist | Moist |
| Example 15 | 290 | 22 | 60 | 110 | Staggered Arrangement | ○ | Moist | Moist |
| Example 16 | 250 | 20 | 30 | 150 | Staggered Arrangement | ○ | Moist | Moist |
| Example 17 | 220 | 23 | 30 | 470 | Staggered Arrangement | ○ | Dry and Smooth | Dry and Smooth |
| Example 18 | 220 | 22 | 30 | 470 | Staggered Arrangement | ○ | Dry and Smooth | Dry and Smooth |

Resin Sheet Evaluation (Cont.)

| | Resin Hardness (A) | Heat Transfer Speed (q-max) (J/cm² · sec) | Ratio of Static Friction Coefficient to Dynamic Friction Coefficient | Contact Angle (°) Purified Water | Surface Resistivity (Ω/□) | Antibacterial Properties | |
|---|---|---|---|---|---|---|---|
| | | | | | | E. coli | Staphylococcus aureus |
| Example 1 | 93 | 0.274 | 2.0 | 123 | — | — | — |
| Example 2 | 93 | 0.270 | 2.3 | 124 | — | — | — |
| Example 3 | 92 | 0.265 | 2.5 | 125 | — | — | — |
| Example 4 | 91 | 0.265 | 2.5 | 124 | — | — | — |
| Example 5 | 91 | 0.270 | 2.1 | 124 | — | — | — |
| Example 6 | 94 | 0.265 | 2.4 | 120 | — | — | — |
| Example 7 | 93 | 0.255 | 2.4 | 125 | — | — | — |
| Example 8 | 91 | 0.272 | 2.3 | 125 | — | — | — |
| Example 9 | 92 | 0.251 | 2.8 | 125 | — | — | — |
| Example 10 | 91 | 0.252 | 2.8 | 135 | — | — | — |
| Example 11 | 91 | 0.250 | 3.5 | 124 | $2.3 \times 10^{11}$ | — | — |
| Example 12 | 91 | 0.251 | 3.2 | 125 | — | <10 | <10 |
| Example 13 | 80 | 0.133 | 1.3 | 85 | — | — | — |
| Example 14 | 80 | 0.166 | 1.2 | 86 | — | — | — |
| Example 15 | 80 | 0.134 | 1.3 | 85 | — | — | — |
| Example 16 | 80 | 0.165 | 1.2 | 84 | — | — | — |
| Example 17 | 94 | 0.300 | 1.1 | 88 | — | — | — |
| Example 18 | 94 | 0.310 | 1.1 | 87 | — | — | — |

Resin Sheet Evaluation

| | Surface Shape | | | | | Good Tactile Sensation | | |
|---|---|---|---|---|---|---|---|---|
| | Average Height of the Hairlike Bodies (μm) | Average Diameter of the Hairlike Bodies (μm) | Average Spacing of the Hairlike Bodies (μm) | Average Thickness of the Under- layer (μm) | Hairlike Body Arrange- ment | "Comfort" when Touched | Texture when "Comfort" was Felt | Texture on a Molded Article |
| Comparative Example 1 | Embossed 55 (Rz) | — | — | 400 | Random | x | Coarse | Coarse |
| Comparative Example 2 | Convex Bell Shape 88 (convex height) | 100 (diameter of convexity bottom) | 100 | 300 | Staggered Arrangement | x | Silky | Silky |
| Comparative Example 3 | Concave Quadrangular Pyramid 45 (concave depth) 45 (concave depth) | 50 (length of one side of concavity bottom) | Pitch: 50 | 250 | Grid Arrangement | x | Slick | Slick |
| Comparative Example 4 | Smooth | — | — | 300 | — | x | Slick | Slick |
| Comparative Example 5 | Convex Hexagonal Pyramid 88 (convex height) | 90 (diameter of convexity bottom) | 90 | 400 | Staggered Arrangement | x | Coarse | Coarse |

TABLE 2-continued

Resin Sheet Evaluation (Cont.)

| | Resin Hardness (A) | Heat Transfer Speed (q-max) (J/cm² · sec) | Ratio of Static Friction Coefficient to Dynamic Friction Coefficient | Contact Angle (°) Purified Water | Surface Resistivity (Ω/□) | Antibacterial Properties E. coli | Staphylococcus aureus |
|---|---|---|---|---|---|---|---|
| Comparative Example 1 | 93 | 0.475 | 1.4 | 124 | — | — | — |
| Comparative Example 2 | 93 | 0.381 | 1.3 | 119 | — | — | — |
| Comparative Example 3 | | 0.421 | 1.1 | 120 | — | — | — |
| Comparative Example 4 | 91 | 0.485 | 1.3 | 85 | — | — | — |
| Comparative Example 5 | 94 | 0.394 | 1.3 | 131 | — | — | — |

The following is clear from the results shown in Table 2.

Results satisfying the evaluation standards pertaining to good tactile sensation were obtained by all the resin sheets of Examples 1-18. In addition, satisfactory results in static friction coefficient with respect to dynamic friction coefficient and contact angle were also obtained. Further, results showing antistatic properties in Example 11 and antibacterial properties in Example 12 were obtained. With regard to this, results satisfying the evaluation standards pertaining to good tactile sensation were not obtained by the resin sheets of Comparative Examples 1-5.

Further, the shapes of the resin sheets obtained in Examples 1-18 were observed under the following conditions with a field emission-type scanning electron microscope (FE-SEM, JEOL, Ltd. JSM-7001F).

It was observed from the scanning electron microscope images that the hairlike bodies do not tangle with one another and extend in a fixed direction. Further, the hairlike bodies had a configuration extending hairlike in a direction away from the base layer and in which swellings are formed at the tips thereof. That is, the shape of the hairlike bodies was a shape in which the cross-sectional area gradually shrinks as the hairlike bodies deviate from the base layer and then once again increases when the shape terminates. Further, it was observed that the shape of the tip part of the hairlike bodies was bud-shaped or mushroom-shaped and the bud-shaped or mushroom-shaped parts were partially hollow. It was observed that a better tactile sensation was expressed by having such a shape.

The present invention was explained above using various embodiments, but it need not be mentioned that the technical scope of the present invention is not limited to the scope described in the above embodiments. It is clear to a person skilled in the art that it is possible to add various modifications or improvements to the above embodiments. Further, it is clear from the recitations of the patent claims that aspects in which such modifications or improvements are added are included in the technical scope of the present invention.

REFERENCE SIGNS LIST

1 . . . Hairlike bodies and base layer
1a . . . Base layer
1b . . . Hairlike bodies
d . . . Diameter of the hairlike bodies
h . . . Height of the hairlike bodies
t . . . Spacing of the hairlike bodies
2 . . . Sealant resin layer
3 . . . Substrate layer

The invention claimed is:

1. A thermoplastic resin sheet having hairlike bodies arranged regularly on at least one surface of a base layer, wherein:
   a continuous phase is formed without a structural boundary between the base layer and the hairlike bodies;
   the average height of the hairlike bodies is more than 100 μm and no greater than 1,200 μm;
   the average diameter of the hairlike bodies is no less than 1 μm and no greater than 50 μm;
   the average spacing of the hairlike bodies is no less than 20 μm and no greater than 60 μm, wherein the average spacing of the hairlike bodies is a distance from a center of a root of a hairlike body to a center of a root of a neighboring hairlike body; and
   the average thickness of the base layer is no less than 50 μm and no greater than 1000 μm.

2. The thermoplastic resin sheet according to claim 1, wherein the thermoplastic resin is a thermoplastic resin using at least one of a styrene based resin, an olefin based resin, a polyvinyl chloride resin, a thermoplastic elastomer, a fluorine based resin, a polyester based resin, and a nylon based resin.

3. The thermoplastic resin sheet according to claim 1, wherein the ratio of the static friction coefficient of the surface having the hairlike bodies with respect to the dynamic friction coefficient thereof is 1.0-10.0.

4. The thermoplastic resin sheet according to claim 1, wherein the heat transfer speed of the surface having the hairlike bodies is 0.005-0.500 J/cm' sec.

5. The thermoplastic resin sheet according to claim 1, configured such that the hairlike bodies extend in a direction away from the base layer and a swelling is formed at the tips of the hairlike bodies.

6. The thermoplastic resin sheet according to claim 1, wherein the base layer and the hairlike bodies are formed from a single sheet.

7. The thermoplastic resin sheet according to claim 1, wherein the resin sheet is a multilayer resin sheet.

8. The thermoplastic resin sheet according to claim 1, wherein at least one substrate layer selected from a styrene based resin, an olefin based resin, a polyester based resin, a nylon based resin, an acrylic based resin, and a thermoplastic elastomer is laminated on the other surface of the base layer.

9. The thermoplastic resin sheet according to claim 1, comprising one or more additives selected from a water and oil repellent, an antistatic agent, and an antibacterial agent.

10. A manufacturing method for the thermoplastic resin sheet according to claim 1, wherein the hairlike bodies are formed by casting, with a transfer roll on which an embossing process has been performed and a touch roll, a sheet that has been melt-extruded from a die with an extrusion molding technique.

11. A molded product of the thermoplastic resin sheet according to claim 1.

12. The molded product according to claim 11, which is a stationery member.

13. The molded product according to claim 11, which is an automobile interior member, an electronic device, an electronic device cladding, a cosmetic container, or a container member that is vacuum/pressure molded on a surface of an existing molded product.

\* \* \* \* \*